US006791658B2

(12) United States Patent
Maruyama et al.

(10) Patent No.: US 6,791,658 B2
(45) Date of Patent: Sep. 14, 2004

(54) LIQUID CRYSTAL DEVICE

(75) Inventors: Tomoko Maruyama, Kanagawa (JP); Yoshinori Uno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 09/950,758

(22) Filed: Sep. 12, 2001

(65) Prior Publication Data

US 2002/0054251 A1 May 9, 2002

(30) Foreign Application Priority Data

Sep. 12, 2000  (JP) .......................................... 2000-277039
Jul. 25, 2001  (JP) .......................................... 2001-224833
Sep. 11, 2001  (JP) .......................................... 2001-275570

(51) Int. Cl.$^7$ ............................................. C09K 19/02
(52) U.S. Cl. ............................ 349/183; 349/10; 349/86; 349/88; 349/139; 349/141
(58) Field of Search ............................. 349/10, 86, 88, 349/183, 139, 141

(56) References Cited

U.S. PATENT DOCUMENTS

| | | | | | |
|---|---|---|---|---|---|
| 4,345,249 | A | * | 8/1982 | Togashi | ....................... 345/103 |
| 5,124,822 | A | * | 6/1992 | Becker et al. | .................. 349/53 |
| 5,321,536 | A | * | 6/1994 | Ishii et al. | ....................... 349/17 |
| 5,331,446 | A | * | 7/1994 | Hirai et al. | ....................... 349/5 |
| 5,342,545 | A | * | 8/1994 | Yamada et al. | ......... 252/299.01 |
| 5,381,256 | A | * | 1/1995 | Hanyu et al. | ................... 349/84 |
| 5,490,001 | A | * | 2/1996 | Konuma | ........................ 349/86 |
| 5,559,615 | A | * | 9/1996 | Takei et al. | .................... 349/70 |
| 5,620,630 | A | * | 4/1997 | Onishi et al. | ............... 264/1.36 |
| 5,673,127 | A | * | 9/1997 | Takahara et al. | ............. 349/140 |
| 5,719,647 | A | * | 2/1998 | Fujikawa et al. | ............. 349/40 |
| 5,926,242 | A | * | 7/1999 | Kataoka et al. | .............. 349/117 |
| 5,963,282 | A | * | 10/1999 | Battersby | ...................... 349/86 |
| 6,040,886 | A | * | 3/2000 | Ota et al. | .................... 349/141 |
| 6,081,312 | A | | 6/2000 | Aminaka et al. | ........... 349/118 |
| 6,108,066 | A | * | 8/2000 | Yanagawa et al. | ........... 349/141 |
| 6,115,095 | A | | 9/2000 | Suzuki et al. | ................ 349/141 |
| 6,127,998 | A | | 10/2000 | Ichikawa et al. | ............ 345/100 |
| 6,175,397 | B1 | | 1/2001 | Inoue et al. | ................... 349/86 |
| 6,259,498 | B1 | * | 7/2001 | Takeda | ......................... 349/84 |
| 6,351,298 | B1 | * | 2/2002 | Mitsui et al. | ................ 349/113 |
| 6,429,914 | B1 | * | 8/2002 | Kubota et al. | ................. 349/86 |

FOREIGN PATENT DOCUMENTS

| | | |
|---|---|---|
| JP | 2-203319 | 8/1990 |
| JP | 2-207220 | 8/1990 |
| JP | 8-15675 | 1/1996 |
| JP | 8-62586 | 3/1996 |
| JP | 10-90649 | * 4/1998 |
| JP | 11-95205 | * 4/1999 |
| JP | 11-149088 | 6/1999 |
| JP | 2000-284264 | 10/2000 |

* cited by examiner

Primary Examiner—George Eckert
Assistant Examiner—Eugene Lee
(74) Attorney, Agent, or Firm—Fitzpatrick, Cella, Harper & Scinto

(57) ABSTRACT

Two electric fields that are directed to respective directions rectangular relative to each other are selectively applied to polymer dispersed liquid crystal by means of electrodes arranged to sandwich the polymer dispersed liquid crystal and electrodes arranged along a substrate to uniformly orient the liquid crystal in either of the directions. While conventional polymer dispersed liquid crystal is adapted to utilize scatter of light in a randomly oriented state, the polymer dispersed liquid crystal of this invention is adapted to utilize a uniformly oriented state to improve the efficiency of scattering light. The present invention is also applicable to devices where polymer dispersed liquid crystal has a memory property.

18 Claims, 9 Drawing Sheets

LIQUID CRYSTAL DEVICE

BACKGROUND OF THE INVENTION

1. Field of the Invention

This invention relates to a liquid crystal device using polymer dispersed liquid crystal.

2. Related Background Art

Since conventional liquid crystal panels (liquid crystal devices) require a polarizing plate for uniformizing polarization direction of light, more than a half of the quantity of incident light is absorbed as incident light passes through the polarizing plate to significantly reduce the luminance of the obtained image.

Contrary to this, light scattering type liquid crystal panels comprising polymer dispersed liquid crystal prepared by combining liquid crystal and a polymer material do not require any polarizing plate and hence is free from the problem of reduced luminance of the obtained image. For this reason, massive efforts are currently being paid in the development of liquid crystal panels of this type.

Meanwhile, polymer dispersed liquid crystal is classified as either of two major types depending on the dispersed state of liquid crystal and that of the polymer material. One is PDLC (polymer dispersed liquid crystal) as used in the proper sense of the word, where minute drops of liquid crystal are dispersed in the polymer material and hence liquid crystal is found in a discontinuous state and the other is PNLC (polymer network liquid crystal) where the polymer material forms a network and liquid crystal is found In a continuous state.

While the two types do not differ from each other in the sense that light is transmitted and scattered by liquid crystal depending on the voltage applied thereto, scatter of light occurs on respective principles that are different from each other. More specifically, PDLC is used to exploit its property that the refractive index varies depending on the direction of orientation of liquid crystal. When no voltage is applied, the liquid crystal of each drop is oriented in its own direction that is not particularly defined. Then, the refractive index of liquid crystal and that of the polymer material differ from each other and hence incident light is scattered. However, when a voltage is applied, all the liquid crystal becomes to be oriented in a same direction. If the polymer material is so selected that its refractive index agrees with that of the liquid crystal when the latter is oriented in a same direction, incident light is transmitted through PDLC.

On the other hand, when no electric field is applied to PNLC, liquid crystal is arranged along the walls of the network of the polymer material so that it is oriented randomly and hence light is scattered by it. However, when a voltage is applied, the molecules of liquid crystal become oriented uniformly so that light is transmitted through PNLC. Therefore, while scatter of light in the inside is largely dependent on the difference between the refractive index of the liquid crystal and that of the polymer for both PNLC and PDLC, the network structure of the polymer also greatly affects the performance. The threshold voltage of PNLC can be made lower than that of PDLC (the ratio of the voltage applied to the liquid crystal of PNLC is higher than that of the voltage applied to the liquid crystal of PDLC when the overall voltage is same for both PNLC and PDLC) and PNLC responses more quickly to the applied voltage than PDLC. This is the reason why PNLC is attracting more attention more than PDLC.

Both PDLC and PNLC can be prepared with ease in a short period of time by uniformly mixing and dissolving ultraviolet-rays-setting type resin and liquid crystal and irradiating ultraviolet rays to the mixture. PDLC is produced when the content ratio of the ultraviolet-rays-setting type resin is raised, whereas PNLC is formed by reducing the content ratio. The size of the voids of the network structure of polymer can be controlled by selecting an appropriate ultraviolet-rays-setting type resin and/or by controlling the intensity of irradiated ultraviolet rays.

Japanese Patent Application Laid-Open No. 2-203319 discloses a method of preparing PDLC by using ultraviolet-rays-setting resin and Japanese Patent Application Laid-Open No. 2-207220 describes a method of preparing PNLC by using ultraviolet-rays-setting resin.

Japanese Patent Application Laid-Open No. 8-015675 discloses PNLC comprising ultraviolet-rays-setting type resin, the PNLC revealing a memory property which can be erased by applying heat thereto.

A polymer dispersed liquid crystal containing cholesteric liquid crystal and showing a memory property both in the focalconic orientation and in the planar orientation is disclosed in Japanese Patent Application Laid-Open No. 11-149088 and other patent documents. However, since such a device involves twisted orientation of liquid crystal molecules, the absolute amount of light transmitted through cholesteric liquid crystal is small if compared with nematic liquid crystal due to a large loss and hence a high contrast effect cannot be expected from it.

Unlike the above listed liquid crystal panels, Japanese Patent Application Laid-Open No. 8-062586 discloses a liquid crystal panel designed to utilize double refraction of liquid crystal. The liquid crystal panel is provided with a polarizating plate and two pairs of electrodes for forming respective electric fields in different directions so that transmission/non-transmission of light is controlled by appropriately shifting the directions of the electric fields.

Japanese Patent Application Laid-Open No. 2000-284264 discloses a method for improving the light scattering efficiency of a liquid crystal panel by orienting polymer showing refractive index anisotropy. With this method, the light scattering efficiency of a liquid crystal panel can be improved by using polymer precursors having a liquid crystal property and forming a polymer arrangement so as to make it show optical anisotropy.

However, conventional PDLC and PNLC adapted to utilize scatter of light are accompanied by the problem of an insufficient intensity of scattering because the orientation of liquid crystal is random when scattering light.

With the technique of erasing the memory state by applying heat (Japanese Patent Application Laid-Open No. 8-015675), it is not possible to accurately control the area to be erased and the timing of erasing and ensure a high image quality for the displayed image.

None of the known liquid crystal devices do not show a memory property both in the transparent state and in the opaque state and they mostly consume power at a high rate.

Additionally, a liquid crystal panel disclosed in Japanese Patent Application Laid-Open No. 8-062586 is accompanied by the problem of a low efficiency of light utilization mainly because it uses a polarizating plate. Still additionally, it requires the use of a back light to make it a poorly power saving device.

The method disclosed in Japanese Patent Application Laid-Open No. 2000-284264 requires a special orienting technique of using in combination a special material as polymer precursor that shows a nematic phase by itself and can be polymerized without disturbing the orientation of liquid crystal and a uniaxial orienting treatment such as rubbing.

SUMMARY OF THE INVENTION

In view of the above identified circumstances, it is therefore an object of the present invention to improve the photo-conversion efficiency of conventional PDLC and PNLC, the scattering efficiency in particular.

Another object of the present invention is to provide a liquid crystal device having a simple configuration and showing an improved scattering efficiency without resorting to a special material and/or a special technique as disclosed in Japanese Patent Application Laid-Open No. 2000-284264.

Still another object of the present invention is to provide a liquid crystal device that can prevent a bad image quality from occurring.

Still another object of the present invention Is to provide a liquid crystal device that serves to save power.

A further object of the present invention is to provide a liquid crystal device that provides a high contrast effect.

According to the invention, the above objects and other objects are achieved by providing a liquid crystal device comprising:

- a pair of substrates arranged vis-a-vis with a predetermined gap separating them;
- polymer dispersed liquid crystal formed by dispersing liquid crystal in a polymer material and arranged in the gap separating the pair of substrates;
- first electrodes for forming an electric field in a first direction relative to said polymer dispersed liquid crystal; and
- second electrodes for forming an electric field in a second direction relative to said polymer dispersed liquid crystal, said second direction being perpendicular to said first direction.

Preferably, in a liquid crystal device according to the invention and comprising such a pair of substrates, the liquid crystal is oriented independently in two directions rectangularly intersecting each other.

DESCRIPTION OF THE PREFERRED EMBODIMENTS

Now, the present invention will be described in greater detail by referring to FIGS. 1A and 1B through FIGS. 6A and 6B that illustrate preferred embodiments of the invention.

Figure 1A:
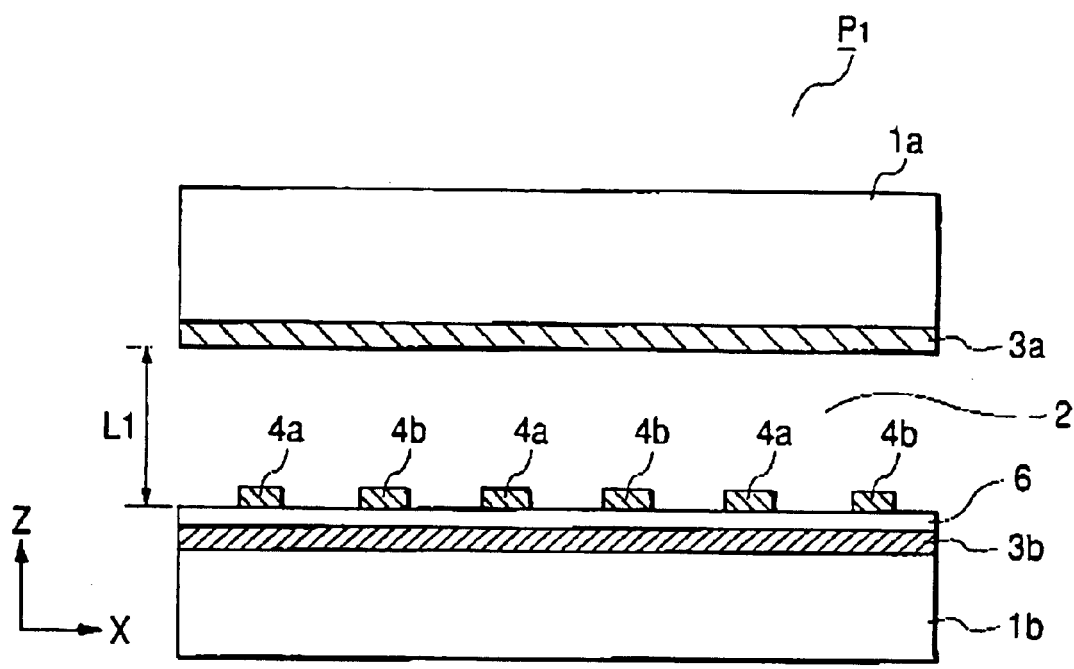
FIGS. 1A and 1B are schematic illustrations of the structure of an embodiment of liquid crystal device according to the invention.
Figure 1B:
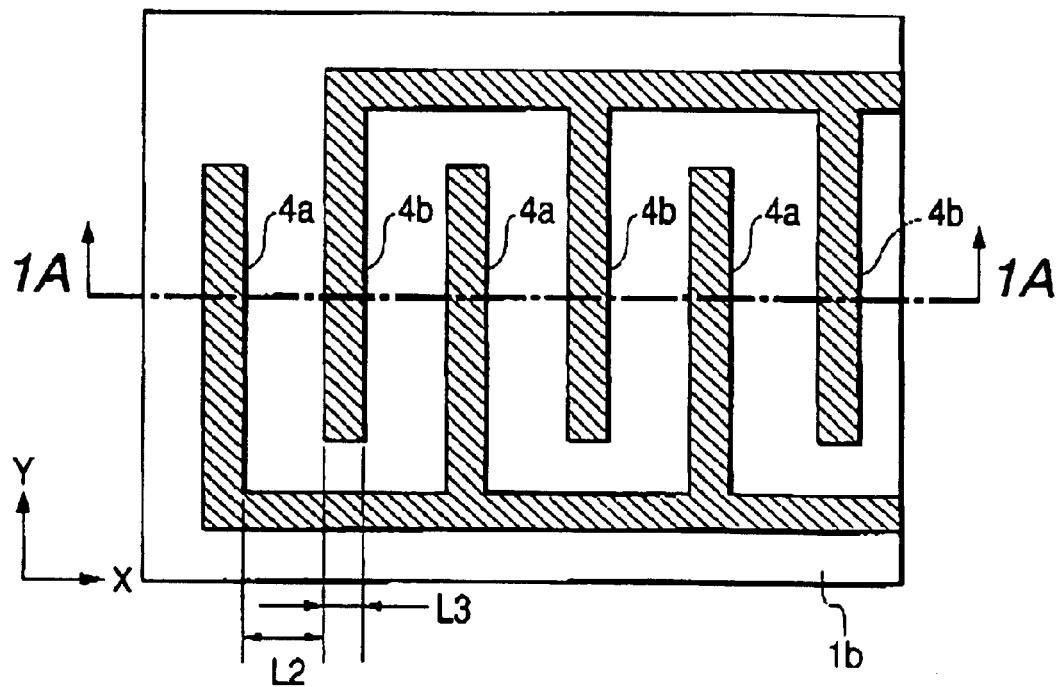

As seen from FIGS. 1A and 1B, the first embodiment P1 of liquid crystal device according to the invention comprises a pair of substrates 1a, 1b arranged with a predetermined gap separating them, polymer dispersed liquid crystal 2 arranged in the gap separating the pair of substrates, a pair of first electrodes 3a, 3b for forming an electric field in a first direction z relative to said polymer dispersed liquid crystal and a pair of second electrodes 4a, 4b for forming an electric field in a second direction x (substantially perpendicular to said first direction z) relative to said polymer dispersed liquid crystal. The liquid crystal is hence oriented in two directions that rectangularly intersect each other depending on the electric field formed by the first pair of electrodes 3a, 3b and the electric field formed by the second pair of electrodes 4a, 4b, as will be described in greater detail hereinafter.

The first electrodes 3a, 3b shown in FIG. 1A may well be arranged to substantially sandwich the liquid crystal 2 and form an electric field in the direction z of the normal relative to the substrates 1a, 1b, whereas the second electrodes 4a, 4b shown in FIGS. 1A and 1B may well be arranged in parallel with each other In the direction x so as to form an electric field in the direction x. As seen from FIG. 1B, the second electrodes 4a, 4b may well be arranged in the proximity of either of the substrates and are realized in the form of stripes and arranged to substantially sandwich the pixels.

However, the profiles and the positional arrangement of the first and second electrodes are not limited to those shown in FIGS. 1A and 1B and may be modified in various different ways.

Figure 2A:
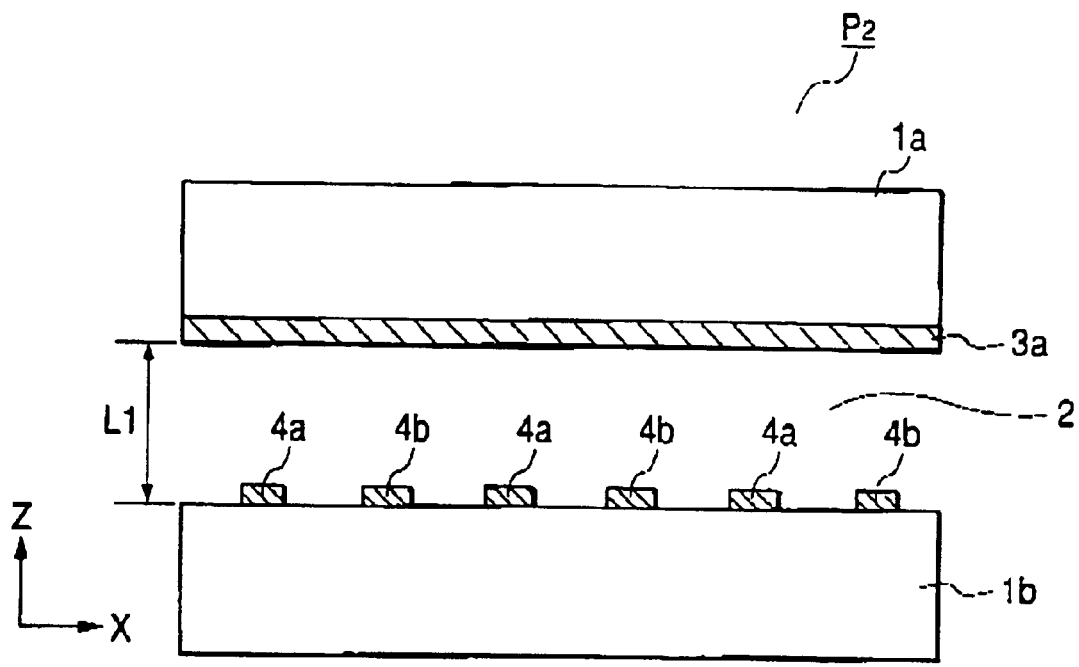
FIGS. 2A and 2B are schematic illustrations of the structure of another embodiment of liquid crystal device according to the invention.

(i) As shown in FIG. 2A, it may be so arranged that the first electrodes include the electrode 3a located at the side of the substrate 1a and the stripe-shaped electrode 4a (or 4b) located at the side of the other substrate 1b, whereas the second electrodes include the stripe-shaped electrode 4a (or 4b) and the electrode 4b (or 4a) disposed opposite to it (so that the electrode 4a or 4b operates as the first electrode and also as the second electrode).

Figure 4A:
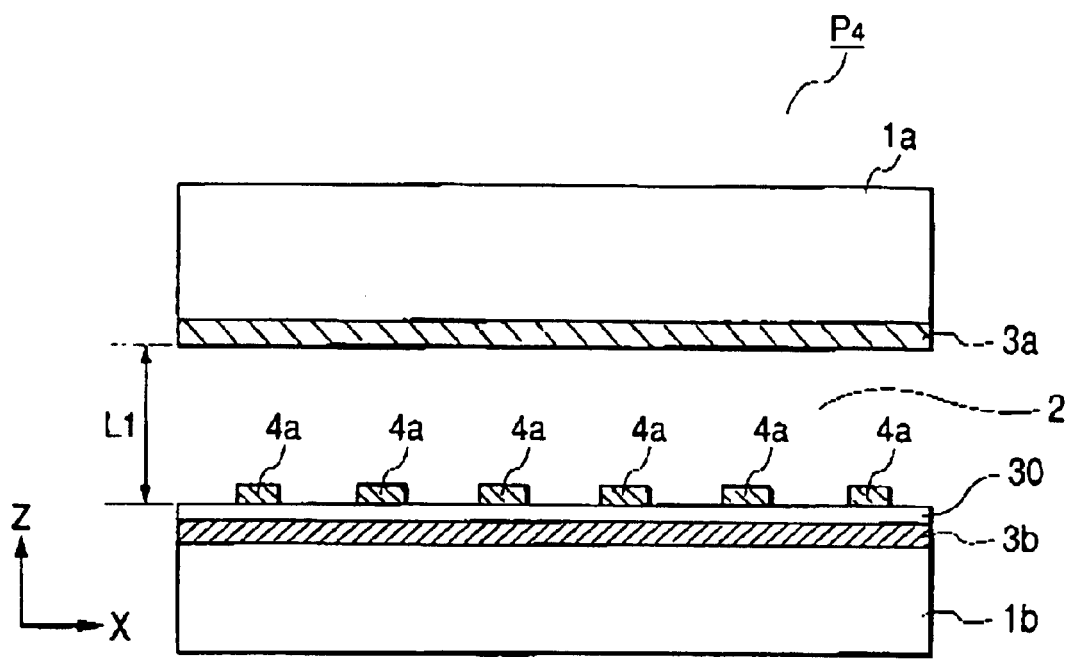
FIGS. 4A and 4B are schematic illustrations of the structure of still another embodiment of liquid crystal device according to the invention.

(ii) As shown in FIG. 4A, it may be so arranged that the first electrodes comprise the electrodes 3a, 3b located at the respective substrates 1a, 1b, whereas the second electrodes comprise the electrode 4a located at one of the substrate 4a and the electrode 3a or 3b (so that the electrode 3a or 3b operates as the first electrode and also as the second electrode).

Figure 4B:
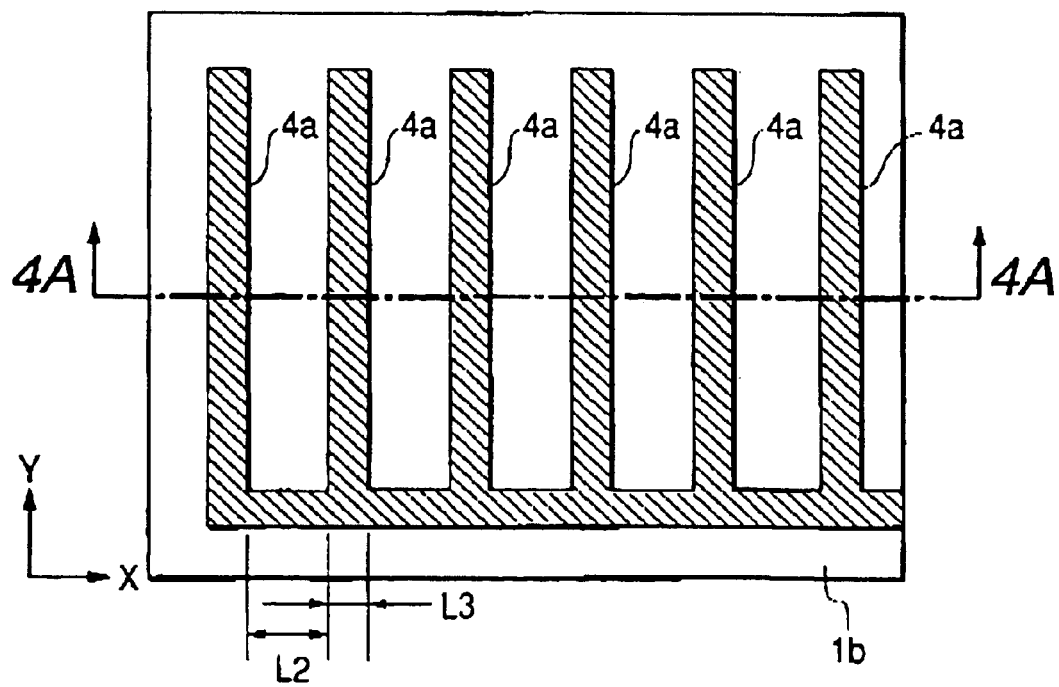
Figure 5A:
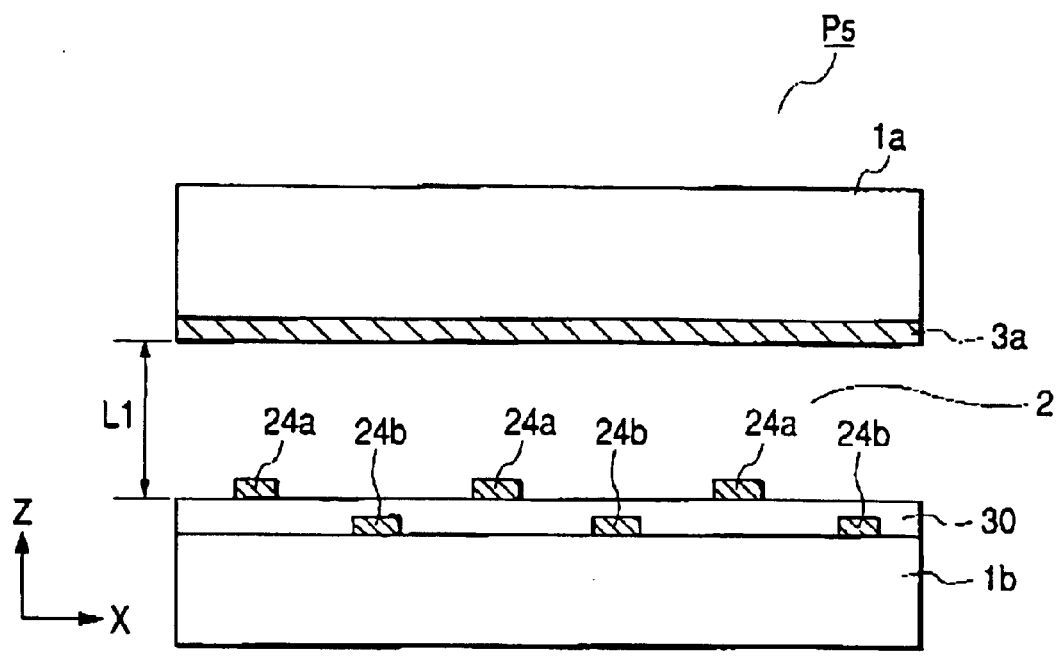
FIGS. 5A and 5B are schematic illustrations of the structure of still another embodiment of liquid crystal device according to the invention.
Figure 5B:
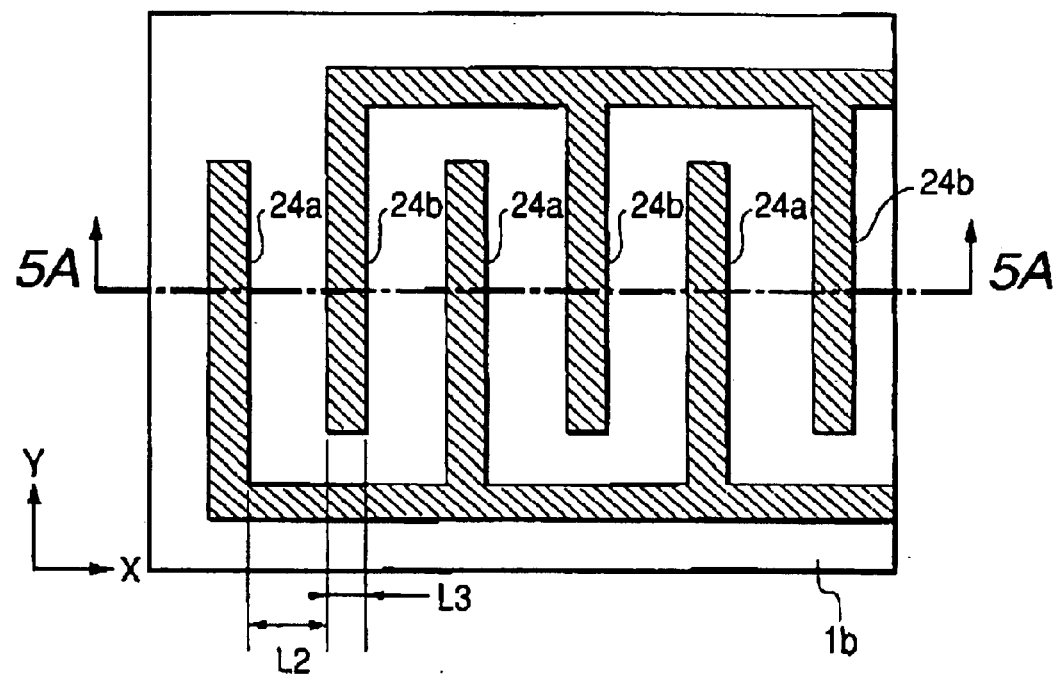

Regardless if the second electrodes 14a, 14b operate as the first electrodes or not, they may have a large thickness (see FIG. 3A) and may be aligned in the z-direction (see FIGS. 1A through 4A) or may not be aligned and arranged zigzag (see FIG. 5A). When the second electrodes 24a, 24b are arranged zigzag as shown in FIGS. 5A and 5B, any possible short circuit between the electrodes 24a and 24b can be effectively prevented by arranging an insulating layer 30 between them. It may be appreciated that the electrode 3b of FIG. 4A can be realized by extending the second electrode 24b of FIG. 5A over the entire area.

The above described electrodes 3a, 3b may be made of a transparent and electrically conductive material such as ITO (indium tin oxide), metal such as Al, Pt, Au or Ti or an alloy of any of them. The electrodes 3a, 3b may be formed by means of an appropriate technique selected from evaporation, sputtering, photolithography, plating and so on.

On the other hand, the polymer dispersed liquid crystal 2 comprises a polymer material and liquid crystal dispersed in the polymer material and the liquid crystal preferably has a memory property.

It is desirable that the refractive index of the polymer material and either of the refractive indices in the direction of the principal axis of the liquid crystal substantially agree with each other. For example, it is desirable that the liquid crystal shows substantially uniaxial optical anisotropy and the refractive index of the polymer material and either of the refractive indices (the refractive index for ordinary light or the refractive index for extraordinary light) of the liquid crystal substantially agree with each other. When the refractive index of the polymer material and the refractive index for ordinary light of the liquid crystal substantially agree with each other and the liquid crystal shows positive dielectric anisotropy, a transparent state can be produced by applying a voltage to the first electrodes sandwiching the polymer dispersed liquid crystal to form an electric field in the normal direction relative to said substrates and a light-scattering state can be produced by applying voltage to the second electrodes arranged along the substrates to form an electric field in the direction running along the substrates as will be described in greater detail hereinafter.

When, on the other hand, the refractive index of the polymer material and the refractive index for extraordinary light of the liquid crystal substantially agree with each other and the liquid crystal shows positive dielectric anisotropy, a light-scattering state can be produced by applying a voltage to the first electrodes sandwiching the polymer dispersed liquid crystal to form an electric field in the normal direction relative to said substrates and a transparent state can be produced by applying voltage to the second electrodes arranged along the substrates to form an electric field in the direction running along the substrates as will be described in greater detail hereinafter.

While the polymer dispersed liquid crystal 2 of this embodiment may be of the PNLC type or of the PDLC type, it may preferably be of the PNLC type from the viewpoint of power saving. The amount by weight of liquid crystal that is mixed with the polymer precursors is preferably equal to or more than that of the latter, preferably two to four times of that of the latter.

Now, the relationship between the refractive indices of the liquid crystal (the drops of the liquid crystal dispersed in the polymer material or liquid crystal filled in the network of the polymer material) and the refractive index of the polymer material will be discussed below. Assume here that the liquid crystal shows uniaxial optical anisotropy.

When the refractive index np of the polymer material is made to be substantially equal to the refractive index no for ordinary light of the liquid crystal, light running in the direction of the optical axis is not scattered and only light running perpendicularly relative to the optical axis is scattered provided that its polarization plane contains the optical axis. Since incident light is normally not polarized, the probability that light running in the direction of the optical axis is scattered. Is equal to and the probability that light running perpendicularly relative to the optical axis is scattered is equal to ½.

On the other hand, when the refractive index np of the polymer material is made to be substantially equal to the refractive index no for extraordinary light of the liquid crystal, light running in the direction of the optical axis is scattered regardless of the direction of the polarization plane and light running perpendicularly relative to the optical axis is scattered if its polarization plane contains the optical axis but not scattered if its polarization plane is also running perpendicularly relative to the optical axis. Thus, the probability that light running in the direction of the optical axis is scattered is equal to 1 and the probability that light running perpendicularly relative to the optical axis is scattered is equal to ½.

If the liquid crystal Is biaxially optically anisotropic, all the refractive indices in the three main axes n1, n2, n3 are different from each other. If any one of them, n1 for instance, is made equal to the refractive index np of the polymer material, only light proceeding through the liquid crystal with a refractive index of n1 is transmitted without being scattered whereas light running through the liquid crystal with any other refractive index is scattered. While the above discussion may be expanded to cover this case, many types of liquid crystal are only very slightly biaxial so that they may be approximated to uniaxial and hence the present invention can be applied thereto.

A liquid crystal device can be made to become transparent when a voltage is applied to the first electrodes 3a, 3b and opaque when a voltage is applied to the second electrodes 4a, 4b simply by using nematic liquid crystal that shows a relationship of np=no and positive dielectric anisotropy. Chiral nematic liquid crystal or smectic liquid crystal may also be used If it can be deemed to be approximately uniaxial.

Similarly, a liquid crystal device can be made to become opaque when a voltage is applied to the first electrodes 3a, 3b and transparent when a voltage is applied to the second electrodes 4a, 4b simply by using nematic liquid crystal, chiral nematic liquid crystal or smectic liquid crystal that shows a relationship of no=np and positive dielectric anisotropy.

In an experiment, a liquid crystal device prepared by the inventors of the present invention by using the electrode-shaped substrates, the polymer precursors, the liquid crystal and the method that will be described below responded to an application of an electric field to change its state and the changed state was maintained after removing the electric field. In other words, it showed a memory property. Since a liquid crystal device according to the invention and having such an electrode structure produces two different states of orientation depending on the electric field applied thereto, the present invention is applicable to a liquid crystal device showing a memory property.

For the purpose of the invention, the liquid crystal preferably shows such a property that it shifts from a transparent state to an opaque state or vice versa when a voltage is selectively applied to the first electrodes 3a, 3b and the second electrodes 4a, 4b and maintains the state after the voltage is removed (and hence shows a memory property).

On the other hand, the polymer material may be formed from mono-functional monomers and/or multi-funtional monomers that can be polymerized by irradiation of light, heating, voltage application or irradiation of radioactive rays. For the purpose of the invention, mono-functional monomers and multi-funtional monomers are appropriately selected to be used.

As mono-functional monomers, hydroxyl (meth)acrylates expressed by formula (1) or (2) below may preferably be used.

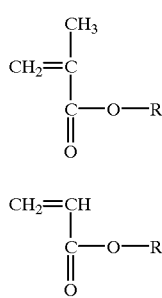

In the above formulas, R represents an aliphatic hydrocarbon group having at least one or more than one hydroxy groups and 1 to 30 carbon atoms.

Examples of hydroxyl (meth)acrylates that can advantageously be used for the purpose of the invention include hydroxyalkyl (meth)acrylates such as 2-hydroxyethyl methacrylate, 2-ethylhexyl methacrylate, 2-ethylhexyl (meth)acrylate, 2-hydroxyethyl acrylate, hydroxypropyl (meth)acrylate and hydroxybutyl(meth)acrylate as well as phenoxyethyl(meth)acrylate and tetrahydrofurfuryl (meth) acrylate.

On the other hand, as multifunctional monomers having two functional groups, alkyldiol di(meth)acrylates (expressed by formula (3) or (4) below) and alkyldiol diglycidyl ether di(meth)acrylates (expressed by formula (5) or (6) below) may preferably be used.

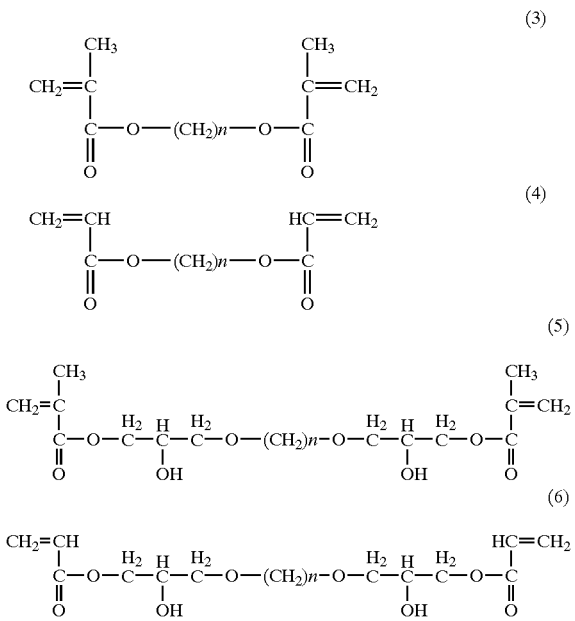

In the above formulas, n represents an integer between 1 and 30.

Particularly preferable examples of alkyldiol diglycidyl ether di(meth)acrylates include hexanediol diglycidyl ether di(meth)acrylate, whereas those of alkyldiol di(meth) acrylates include 1,6-hexanediol di(meth)acryate.

Other examples of alkyldiol diglyicidyl ether di(meth) acrylates that can be used for the purpose of the invention include ethylene glycol diglycidyl ether di(meth)acrylate and butanediol diglycidyl ether di(meth)acrylate, whereas those of alkyldiol di(meth)acrylates include ethylene glycol di(meth)acrylate and butanediol di(meth)acrylate. The number of carbon atoms in the alkyl groups, the number of hydroxy groups and the bonding positions of hydroxy groups are not subjected to any particular limitations.

Other monomers that can also be used for the purpose of the invention include bisphenol A ethylene oxide (hereinafter referred to as EO) modified di(meth)acrylate, isocyanuric acid EO modified di(meth)acrylate, tripropylene glycol di(meth)acrylate, pentaerythritol diacrylate monostearate, polyethylene glycol di(meth)acrylate, polypropylene glycol di(meth)acrylate, caprolactone modified hydroxypivalic acid ester neopentyl glycol diacrylate ("X220", "X620", tradename, available from Nippon Kayaku) and tricyclodecane dimethanol diacrylate ("684", tradename, available from Nippon Kayaku).

Meanwhile, a photopolymerization initiator may well be added to any of the above listed polymer precursors for causing a polymerizing reaction to take place by irradiating light. Examples of photopolymerization initiators that can be used for the purpose of the invention include 1-hydroxycyclohexyl phenyl ketone (e.g. "IRGACURE 184", tradename, available from Ciba Geigy), benzyl dimethyl ketal (e.g. "IRGACURE 651", tradename, available from Ciba Geigy), 2-methyl-1-[4-(methylthio)phenyl]-2-morphorinopropane-1-one (e.g., "IRGACURE 907", tradename, available from Ciba Geigy), 2-hydroxy-2-methyl-1-phenylpropane-1-one (e.g., "DAROCURE 1173", tradename, available from Ciba Geigy), 1-(4-isopropylphenyl)-2-hydroxy-2-methylpropane-1-one (e.g., "DAROCURE 1116", tradename, available from Ciba Geigy), a mixture of 2,4-dimethylthioxanthone (e.g., "KAYACURE DETX", tradename, available from Nippon Kayaku) and ethyl p-dimethylaminobenzoate (e.g., "KAYACURE EPA", tradename, available from Nippon Kayaku), a mixture of isopropylthioxanthone (e.g., "QUANTACURE ITX", tradename, available from Wardbreakynthop) and ethyl p-dimethylaminobenzoate, and acylphosphine oxide (e.g., "LUCIRIN TPO", tradename, available from BASF). The photopolymerization initiator is used preferably at a ratio between 0.01 and 5 wt % relative to the total weight of the mixture of the polymer precursors and the liquid crystal.

The substrates 1a, 1b may be made of a hard material such as glass or quartz or a flexible material such as polyethylene terephthalate (PET), polyether sulfone (PES), polyimide (PI) or polycarbonate (PC).

While the embodiments P1 through P6 of liquid crystal device according to the invention may be either of the transmission type or of the reflection type, all the components of a transmission type liquid crystal device including the substrates 1a, 1b and the electrodes 3a, 3b have to be made of respective transparent materials, whereas, in the case of a reflection type liquid crystal device, the electrode formed at the side of one of the substrates 1a (or 1b) is made of a transparent material and the electrode formed at the side of the other substrate 1b (or 1a) needs to be provided with a reflection feature. The electrode may be provided with a reflection feature (1) by arranging a reflector panel at the side of the other substrate 1b (or 1a) or (2) by making one of the components (e.g., one of the substrates or the electrodes) operate as reflector panel. With such an arrangement, the components (such as the electrodes and the substrates although they may vary depending on the location of the reflector panel) located in front of the reflector panel needs to be made of respective transparent materials.

Figure 6A:
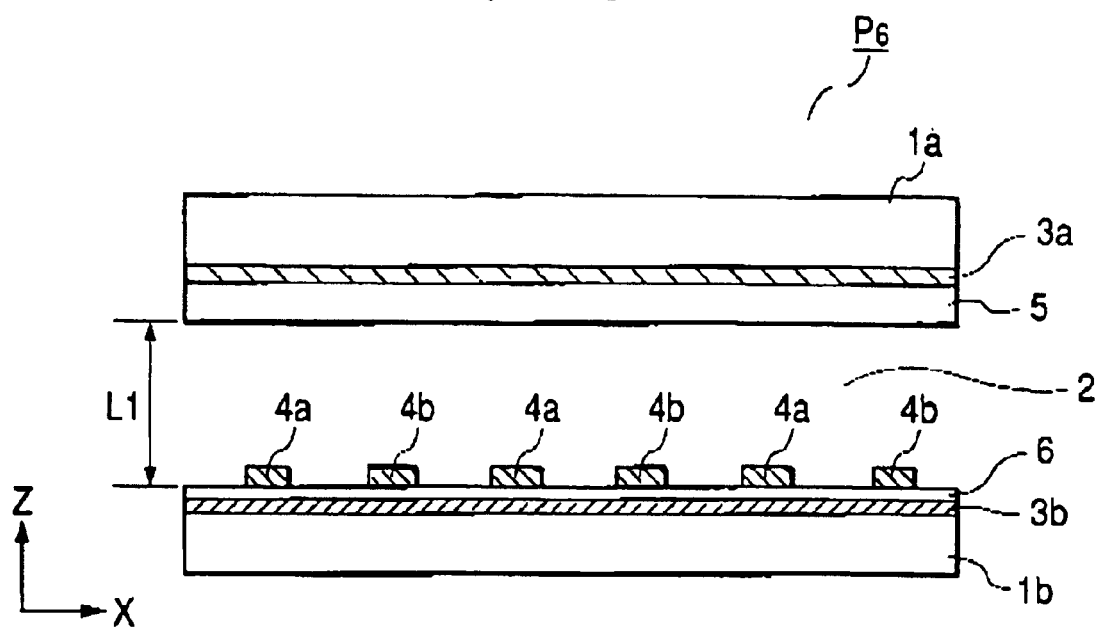
FIGS. 6A and 6B are schematic illustrations of the structure of still another embodiment of liquid crystal device according to the invention.
Figure 6B:
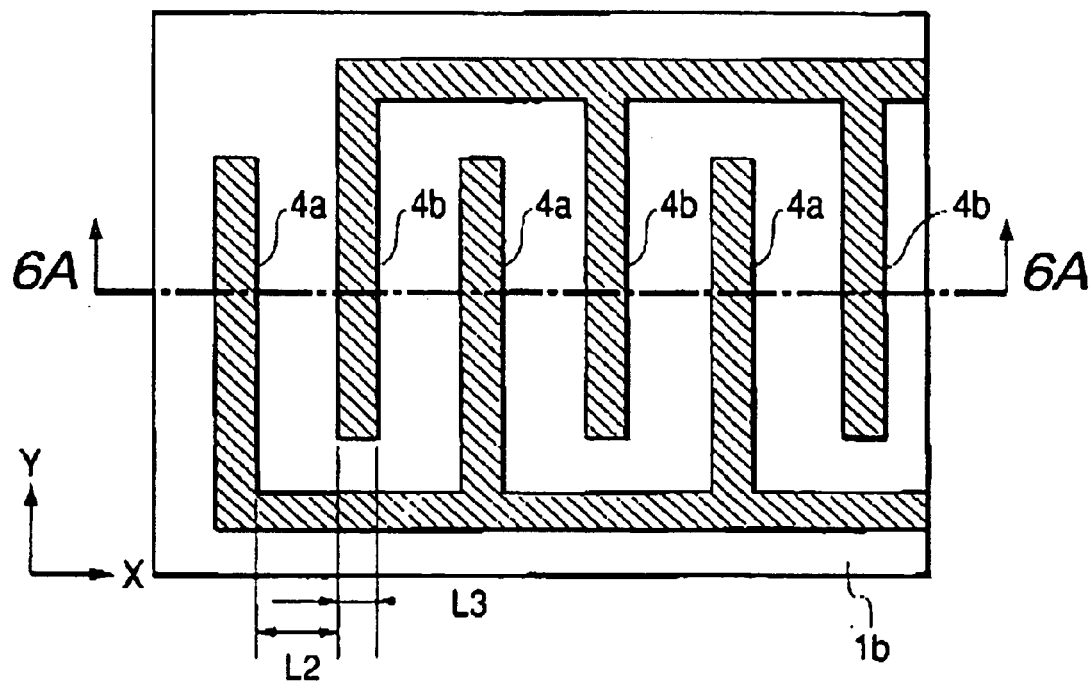

As shown in FIGS. 6A and 6B, an insulating layer 5 may be provided to cover the electrode 3a. It should be noted that the electrode 3a can interfere with the operation of writing when a voltage is applied to the electrodes 4a, 4b. Therefore, an insulating layer 5 is preferably arranged on the substrate located vis-a-vis the electrodes 4a, 4b.

Figure 8A:
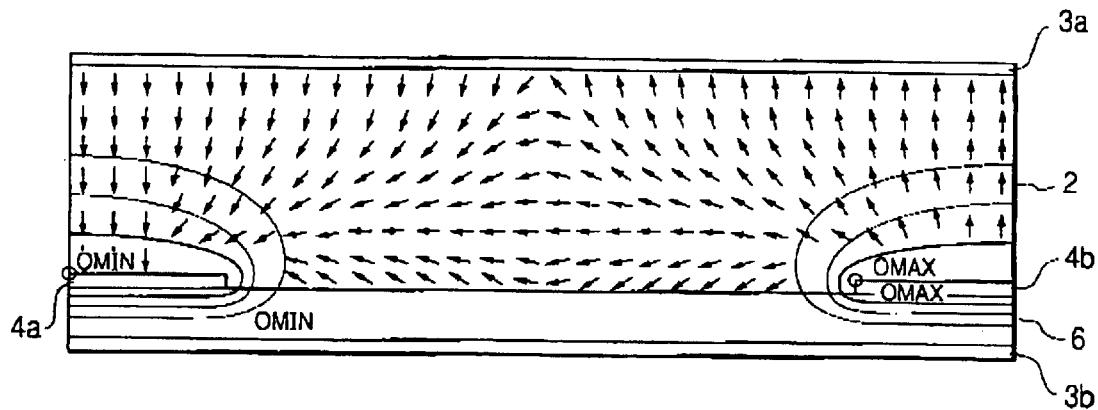
FIGS. 8A and 8B are schematic illustrations of the electric field distribution of a liquid crystal device according to the invention.
Figure 8B:
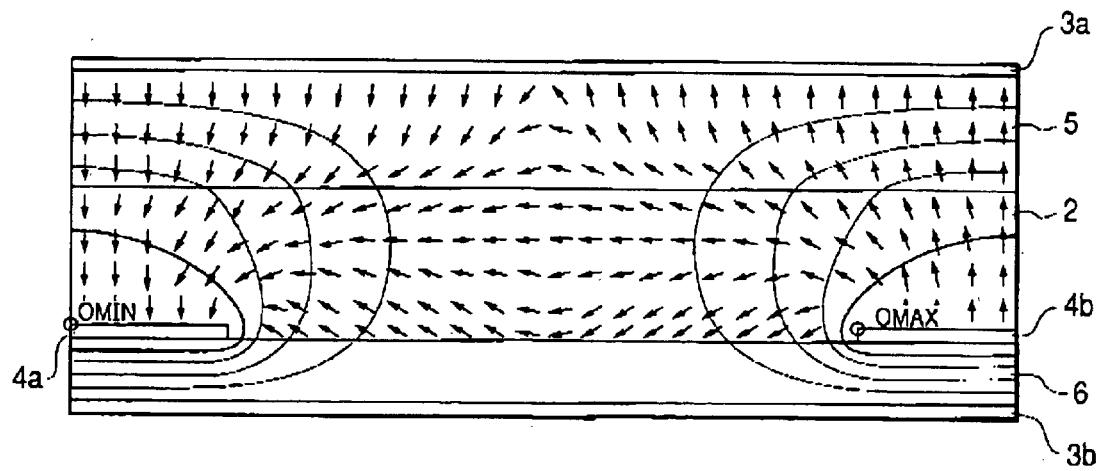

Now, the effect of the insulating layer 5 for preventing interference with the writing operation will be described by referring to FIGS. 8A and 8B. FIGS. 8A and 8B schematically illustrate how the provision of an insulating layer affects lines of electric force. FIG. 8A shows lines of electric force when no insulating layer is provided while FIG. 8B shows those when an insulating layer is provided. As seen from FIG. 8A, when no insulating layer is provided, the electric field is partly distorted by the electrode 3a disposed oppositely with the polymer dispersed liquid crystal 2 interposed therebetween so that the writing operation and the consequent image displaying operation may not be conducted satisfactorily. To the contrary, as seen from FIG. 8B, when an insulating layer is provided, the electric field distorted by the opposite electrode 3a is confined by the insulating layer 5 so that a uniform electric field is applied to the polymer dispersed liquid crystal 2 and hence the writing operation and the consequent image displaying operation are conducted satisfactorily.

An effectively distributed electric field is formed as shown in FIG. 8B when the dielectric constant of the polymer dispersed liquid crystal 2 is greater than the dielectric constant $\in 1$ of the insulating layer 5. Therefore, it is desirable to use a liquid crystal material showing a dielectric constant $\in 2$ greater than the dielectric constant $\in 1$ of the insulating layer 5, or $\in 1 < \in 2$.

A good contrast effect can be obtained when the liquid crystal material shows a dielectric constant $\in 2$ defined by $2 \times \in 1 < \in 2$.

The insulating layer is preferably made of a low dielectric constant material such as any of appropriate acrylic resins or silicon oxide. Techniques that can be used for forming the insulating layer include spin coating, dipping, printing, sputtering and evaporation. Materials that can be used for the insulating layer also include thermosetting resins and photosetting resins.

Now, the method for driving the above described liquid crystal device and its light scattering effect will be described below.

Firstly, let us assume $np=no$.

When liquid crystal showing a positive dielectric anisotropy is used for the polymer dispersed liquid crystal 2 and a voltage is applied to the first electrodes 3a, 3b, its refractive index match with the polymer so that light can be transmitted through the polymer dispersed liquid crystal 2 and the latter becomes transparent because the directors of the liquid crystal molecules are aligned in the sense of the voltage application. If the voltage is removed thereafter, the transparent state is maintained for a desired period of time. At this time, the liquid crystal is held to a state where its molecules are mostly oriented in the z-direction. On the other hand, when a voltage is applied to the second electrodes 4a, 4b, the refractive index of the liquid crystal is mismatched with the refractive index of the polymer so that light is scattered at the interfaces of the liquid crystal and the polymer and the polymer dispersed liquid crystal 2 becomes opaque because the directors of the liquid crystal molecules are mostly aligned in the sense of electric field application. At this time, the liquid crystal is held to a state where its molecules are mostly oriented in the x-direction. If the voltage is removed thereafter, the opaque state is maintained for a desired period of time.

In conventional PDLC, liquid crystal molecules are randomly oriented in isotropic liquid crystal droplets. As described in Japanese Patent Application Laid-Open No. 2000-284264, the average refractive index of such liquid crystal droplets is equal to $(ne+2no)/3$. If light striking PDLC is decomposed into S-polarized light and P-polarized light, the differences between the above value and the refractive indices for S-polarized light and P-polarized light are obtained respectively by the following equations.

(S-polarized light):$(ne+2no)/3-np=-\Delta n/3$ (P-polarized light):$(ne+2no)/3-np=\Delta n/3$ Thus, the sum of the differences is equal to $2\Delta n/3$.

On the other hand, according to the present invention, the directors of liquid crystal molecules are mostly oriented in the direction of electric field application when a voltage is applied to the second electrodes 4a, 4b. The differences between the average refractive index and the refractive indices for S-polarized light and P-polarized light are obtained respectively by the following equations.

(S-polarized light):$ne-np=\Delta n$ (P-polarized light):$no-np=0$

Thus, the sum of the differences is equal to $\Delta n$, which is one and a half times greater than the corresponding value of conventional PDLC.

Now, let us assume $np=ne$.

When liquid crystal showing a positive dielectric anisotropy is used for the polymer dispersed liquid crystal 2 and a voltage is applied to the first electrodes 3a, 3b, the refractive index of the polymer is mismatched with the refractive index of the liquid crystal so that light is scattered and the polymer dispersed liquid crystal 2 becomes opaque because the directors of the liquid crystal molecules are mostly aligned in the sense of the voltage application. If the voltage is removed thereafter, the opaque state is maintained for a desired period of time. At this time, the liquid crystal is held to a state where its molecules are mostly oriented in the z-direction. On the other hand, when a voltage is applied to the second electrodes 4a, 4b, the directors of the liquid crystal molecules are mostly aligned in the sense of voltage application and hence light having a polarization plane containing the directors is not scattered at the interfaces of the liquid crystal and the polymer, whereas light having a polarization plane perpendicular to the above polarization plane is scattered. As a result, the scatter of light is weak if compared with the case of applying a voltage to the first electrodes 3a, 3b and hence the polymer dispersed liquid crystal 2 becomes semi-opaque. At this time, the liquid crystal is held to a state where its molecules are mostly oriented in the x-direction. If the voltage is removed thereafter, the opaque state is maintained for a desired period of time.

The differences between the average refractive index and the refractive indices for S-polarized light and P-polarized light when a voltage is applied to the first electrodes 3a, 3b are obtained respectively by the following equations.

(S-polarized light):$no-np=-\Delta n$ (P-polarized light):$no-np=-\Delta n$

Thus, the sum of the differences is equal to $2\Delta n$ in terms of absolute value.

When a voltage is applied to the second electrodes 4a, 4b, the directors of the liquid crystal molecules are mostly oriented in the direction of electric field application. Then, the differences between the average refractive index and the refractive indices for S-polarized light and P-polarized light are obtained respectively by the following equations.

(S-polarized light): $n_e - n_p = 0$ (P-polarized light): $n_o - n_p = -\Delta n$ Thus, the sum of the differences is equal to $\Delta n$. Then, the contrast is 2:1.

With conventional PDLC showing $n_e = n_p$, a scattered state appears with the sum of the differences of the refractive indices of $2\Delta n$ in terms of absolute value when an electric field is applied thereto, the sum being equal to that of the above described case where a voltage is applied to the first electrodes 3a, 3b, whereas the liquid crystal is randomly oriented when no electric field is applied thereto. Thus, (S-polarized light): $(n_e + 2n_o)/3 - n_p = -2\Delta n/3$ and (P-polarized light): $(n_e + 2n_o)/3 - n_p = -2\Delta n/3$ to give rise to a sum equal to $4\Delta n/3$ and a scattered state. Then, the contrast is 1.5:1. The present invention provides a higher contrast to suggest a better quality for the displayed image.

According to the invention, an isotropic polymer material can be used without subjecting the polymer material in which liquid crystal is dispersed to a special orienting treatment. However, it should be noted that polymer dispersed liquid crystal according to the invention shows improvements in certain properties if the polymer material is not isotropic and shows optical anisotropy in a particular direction.

A typical example is observable when the polymer molecules are oriented in a direction parallel to that of the stripe-shaped second electrodes 4a, 4b.

Then, the polymer material is optically anisotropic and its refractive index npX in the direction of the X-axis differs from its refractive index npY in the direction of the Y-axis in FIG. 1. Therefore, when a voltage is applied to the first electrodes 3a, 3b and the liquid crystal is oriented in the Z-direction, a completely matched state that corresponds to the case where np=no for an isotropic polymer material is not obtained for the refractive indices and hence not all light will be transmitted.

However, when a voltage is applied to the second electrodes 4a, 4b and the liquid crystal is oriented in the X-direction, a mismatched state occurs for both S-polarized light and P-polarized light so that the probability of scattering may be higher than that of the case where np=no for an isotropic polymer material depending on the value of npX and that of npY. In other words, according to the invention, it is possible to obtain highly light-scattering polymer dispersed liquid crystal, while the degree of transparency in the transparent state thereof may be damaged to some extent.

When the second electrodes are realized in a stripe-shaped form as shown in FIGS. 1A and 1B through FIGS. 6A and 6B, a uniaxial orienting treatment is conducted preferably in the longitudinal direction of the stripes. Refractive index anisotropy can appear in the polymer structure during the process of forming the polymer dispersed liquid crystal as a result of the uniaxial orienting treatment conducted on the substrate in advance. Therefore, the mismatch in terms of refractive index between the maintained orientation of the liquid crystal and the polymer structure is increased to consequently improve the light-scattering efficiency when a uniaxial orienting treatment is conducted in the scattered state maintained after the application of an electric field to the second electrodes.

Such a uniaxial orienting treatment is preferably conducted also on the surface of the insulating layer shown in FIGS. 6A and 6B and not only on one of the substrates but also on both the upper and lower substrates in a same direction (y-direction). Such a uniaxial orienting treatment can be carried out by means of a rubbing technique or by irradiation of light.

One or more than one spacers (not shown) may be arranged between the substrates.

Now, a method of manufacturing a liquid crystal device will be described below.

When manufacturing a liquid crystal device, a pair of substrates 1a, 1b are arranged with a predetermined gap separating them and then electrodes 3a, 3b that may have any of the above described profiles are placed in position.

If necessary, an insulating layer 5 is arranged in a manner as described above.

When no insulating layer 5 is used, after the electrodes 3a, 3b are arranged, the substrate 1a and/or the substrate 1b are subjected to a uniaxial orienting treatment. When, on the other hand, an insulating layer 5 is used and if necessary, the insulating layer 5 is also subjected to a uniaxial orienting treatment typically by means of a rubbing technique.

Then, polymer dispersed liquid crystal 2 is arranged in the gap separating the substrates. Processes that can be used for arranging polymer dispersed liquid crystal 2 include the following.

(1) After bonding the substrates 1a, 1b together, a mixture of polymer precursors and liquid crystal is injected into the gap separating the substrates by utilizing the capillary phenomenon.

(2) Polymer dispersed liquid crystal 2 is applied to one of the substrates 1a (or 1b) before they are bonded together and subsequently the substrates 1a, 1b are bonded.

(3) A mixture of polymer precursors and liquid crystal is placed on one of the substrates 1a (or 1b) and then the other substrate 1b (or 1a) is bonded to the former substrate by means of a laminating technique.

The polymer dispersed liquid crystal 2 is produced by polymerizing and setting the polymer precursors with the liquid crystal dispersed therein. Techniques that can be used for the polymerization include irradiation of light, heating, voltage application or irradiation of radioactive rays.

With conventional PDLC, scattered light is produced by utilizing the phenomenon that liquid crystal becomes irregularly oriented when the application of voltage to the liquid crystal is suspended. With this embodiment of the present invention, to the contrary, a voltage is applied either to the first electrodes 3a, 3b or to the second electrodes 4a, 4b for producing scattered light. Thus, the liquid crystal is always oriented in a predetermined direction to improve the intensity of scattered light if compared with conventional PDLC.

Additionally, since the liquid crystal substantially shows uniaxial optical anisotropy and the refractive index of the polymer material and that of the liquid crystal (the refractive index for ordinary light or the refractive index for extraordinary light) is made substantially equal to each other, both a transparent state and a light-scattering state can be produced by modifying the direction of orientation. Then, it is no longer necessary to use a polarizing plate to consequently reduce the number of parts of the liquid crystal device, the manufacturing cost and the overall weight of the element and, at the same time, improve the transmittance of light to display a high quality bright image.

When the liquid crystal substantially shows uniaxial optical anisotropy and the refractive index of the polymer material and that of the liquid crystal for ordinary light are made substantially equal to each other, any of lights having various polarization planes transmits the liquid crystal. Hence, high quality images with high contrast and high brightness can be displayed.

When the liquid crystal having a memory property is used, both the transparent state and the opaque state are maintained. In other words, it is no longer necessary to constantly apply a voltage thereto to bring forth a power saving effect. In the case of a known device disclosed in Japanese Patent Application Laid-Open No. 8-015675, the display state (memory state) is erased by heating so that it is not possible to accurately control the area to be erased and the timing of erasing. To the contrary, with the above described embodiment of the present invention, the transparent state and the light-scattering state can be switched by applying a voltage to the first electrodes 3a, 3b or the second electrodes 4a, 4b so that both the area to be erased and the timing of erasing can be accurately controlled to realizing a high speed rewriting operation and a high displayed image quality.

Additionally, when the first or second electrodes are made to operate partly as the other electrodes, the number of electrodes is reduced to simplify the manufacturing process.

Furthermore, when an insulating layer is additionally provided, the above embodiments allow rewriting operations with an excellently displayed image.

Finally, when a uniaxial orienting treatment is conducted on the above embodiments, they allow rewriting operations with an excellently displayed image.

Now, the present invention will be described further by way of examples.

EXAMPLE 1

2-hydroxyethylmetacrylate (HEMA) that is a mono-functional monomer was mixed with "KAYARAD R-167" (1,6-hexanediol diglycidyl ether diacrylate, to be referred to as R-167 hereinafter) and 1,6-hexanediol diacrylate (HDDA) that are bi-functional monomers to a ratio of 5:4:1 by weight.

Then, nematic liquid crystal "BL009" (mixture) available from Merck that has positive dielectric anisotropy was added to the polymer precursors at a mixing ratio of 7:3 by weight. The obtained mixture was then stirred and mixed well on a hot plate heated to 110° C. Thereafter, a weight portion of "IRGACURE 184" available from Ciba Geigy was added as polymerization initiator to 100 weight portions of the above mixture. The mixture was then stirred and mixed well also at 110° C.

Thereafter, 1,000 Å thick ITO electrodes 3a, 3b were formed by photolithography respectively on a pair of 1 mm thick glass substrates 1a, 1b as shown in FIGS. 1A and 1B. Then, a 1,000 Å thick coat of $SiO_2$ film 6 was formed on the ITO electrode 3b on one of the substrates by sputtering except the electrode leading out section and subsequently comb-shaped ITO electrodes 4a, 4b were formed on the coat film by photolithography. When forming the electrodes 4a, 4b, resist ("OEBR1000", tradename, available from Tokyo Oka) was applied to a thickness of 0.5 μm by spin coating and exposed to light by means of an exposure system ("PLA520": tradename, available from Canon). The comb-shaped electrodes had a width L3 of 3 μm and separated from each other by a gap L2 of 10 μm.

Then, silica beads (not shown) having a particle size of 7 μm and adhesive particles (not shown) were sown on the pair of substrates 1a, 1b, which were then bonded together with a gap L1 of 7 μm interposed between them.

Thereafter, the bonded substrates were held on a thermoregulator at 110° C. and the mixture of the liquid crystal, the polymer precursors and the polymerization initiator was injected into the gap between the substrates and then irradiated with ultraviolet rays at an intensity level of 10 $mW/cm^2$ for 10 minutes. Subsequently, the work was held still for 30 minutes without being irradiated with ultraviolet rays and cooled to room temperature. As a result of the above process, the polymer precursors were polymerized to produce polymer dispersed liquid crystal 2. At this stage, the element was opaque because of scattered light.

While it is difficult to measure the refractive index of the polymer material and that of the liquid crystal of the formed polymer dispersed liquid crystal independently, it will be safe to estimate that the refractive index of the polymer is about 1.5 on the basis of the above mixing ratio. On the other hand, the catalogued values of ne=1.818 and no=1.527 (by Merck) may be reliable. Therefore, the equation of no=np substantially holds true.

Figure 7:
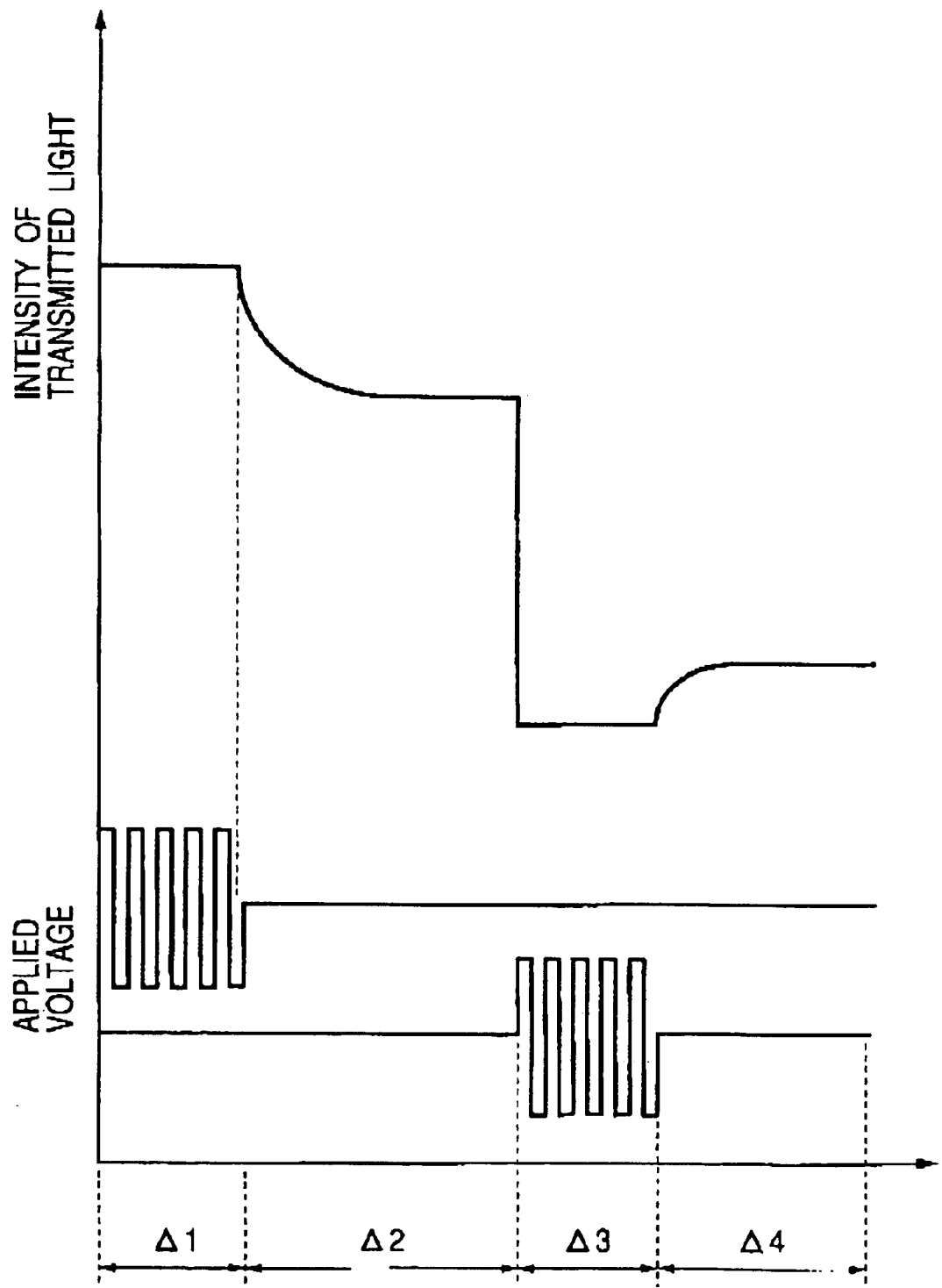
FIG. 7 is a graph illustrating the relationship between the applied voltage and the intensity of transmitted light.

An AC voltage (±80V, 2.5 kHz) was applied between the electrodes 3a and 3b of the prepared liquid crystal panel P1 to turn it transparent (see symbol Δ1 in FIG. 7). The transparent state of the panel was maintained after removing the applied AC voltage (see symbol Δ2 in FIG. 7). Then, a same AC voltage (±80V, 2.5 kHz) was applied between the electrodes 4a and 4b to turn the liquid crystal panel P1 opaque (see symbol Δ3 in FIG. 7) and the opaque state of the panel was maintained after removing the applied AC voltage (see symbol Δ4 in FIG. 7).

EXAMPLE 2

2-hydroxyethyl metacrylate (HEMA) that is a mono-functional monomer was mixed with nematic liquid crystal "BL001" (mixture) available from Merck that has positive dielectric anisotropy at a mixing ratio of 1:1 by weight. The obtained mixture was then stirred and mixed well on a hot plate heated to 110° C. Thereafter, a weight portion of "IRGACURE 184" available from Ciba Geigy was added as polymerization initiator to 100 weight portions of the above mixture. The mixture was then stirred and mixed well also at 110° C.

As in Example 1, electrodes 3a, 3b, 4a, 4b were formed on a pair of substrates 1a, 1b, which were then bonded together, and the mixture of the polymer precursor and the polymerization initiator was injected into the gap between the substrates and then irradiated with ultraviolet rays at an intensity level of 60 $mW/cm^2$ for 10 minutes. Subsequently, the work was cooled to room temperature. As a result of the above process, the polymer precursor was polymerized to produce polymer dispersed liquid crystal 2. At this stage, the element was opaque because of scattered light.

The estimated refractive index of the polymer material was np=1.5, whereas the catalogued values of ne=1.75, and no=1.52, (by Merck) were assumed to be reliable. Therefore, again, the equation of no=np substantially holds true.

An AC voltage (±80V, 2.5 kHz) was applied between the electrodes 3a and 3b of the prepared liquid crystal panel P1 to turn it transparent (see symbol Δ1 in FIG. 7). The transparent state of the panel was maintained after removing the applied AC voltage (see symbol Δ2 in FIG. 7). Then, a same AC voltage (±80V, 2.5 kHz) was applied between the electrodes 4a and 4b to turn the liquid crystal panel P1 opaque (see symbol Δ3 in FIG. 7) and the opaque state of the panel was maintained after removing the applied AC voltage (see symbol Δ4 in FIG. 7).

EXAMPLE 3

2-hydroxyethyl metacrylate (HEMA) that is a monofunctional monomer was mixed with "KAYARAD R-167" (1,6-hexanediol diglycidyl ether diacrylate, to be referred to as R-167 hereinafter) and 1,6-hexanediol diacrylate (HDDA) that are bi-functional monomers to a ratio of 5:4:1 by weight.

Then, nematic liquid crystal "DF01XX" (mixture) available from Chisso that is so-called two-frequency driven liquid crystal whose dielectric anisotropy varies depends on frequency was added to the polymer precursors at a mixing ratio of 7:3 by weight. The obtained mixture was then stirred and mixed well on a hot plate heated to 110° C. Thereafter, a weight portion of "IRGACURE 184" available from Ciba Geigy was added as polymerization initiator to 100 weight portions of the above mixture. The mixture was then stirred and mixed repeatedly also at 110° C.

As in Example 1, electrodes 3a, 3b, 4a, 4b were formed on a pair of substrates 1a, 1b, which were then bonded together, and the mixture of the liquid crystal, the polymer precursor and the polymerization initiator was injected into the gap between the substrates and then irradiated with ultraviolet rays at an intensity level of 60 mW/cm$^2$ for 10 minutes. Subsequently, the work was cooled to room temperature. As a result of the above process, the polymer precursors were polymerized to produce polymer dispersed liquid crystal 2. At this stage, the element was opaque because of scattered light.

An AC voltage (±80V, 2.5 kHz) was applied between the electrodes 3a and 3b of the prepared liquid crystal panel P1 to turn it transparent (see symbol Δ1 in FIG. 7). The transparent state of the panel was maintained after removing the applied AC voltage (see symbol Δ2 in FIG. 7). Then, a same AC voltage (±80V, 2.5 kHz) was applied between the electrodes 4a and 4b to turn the liquid crystal panel P1 opaque (see symbol Δ3 in FIG. 7) and the opaque state of the panel was maintained after removing the applied AC voltage (see symbol Δ4 in FIG. 7). Furthermore, when an AC voltage (±80V, 100 kHz) was applied between the electrodes 3a and 3b, the polymer dispersed liquid crystal P1 was turned opaque (light was scattered in it) and the opaque state of the panel was maintained after removing the applied AC voltage. When the same AC voltage (±80V, 100 kHz) was applied between the electrodes 4a and 4b, the polymer dispersed liquid crystal P1 was turned transparent and the transparent state of the panel was maintained after removing the applied AC voltage. This effect is attributable to the fact that the two-frequency driven liquid crystal shows positive dielectric anisotropy in a low frequency zone and negative dielectric anisotropy in a high frequency zone.

EXAMPLE 4

2-hydroxyethyl metacrylate (HEMA) that is a monofunctional monomer was mixed with "KAYARAD R-167" (1,6-hexanediol diglycidyl ether diacrylate, to be referred to as R-167 hereinafter) and 1,6-hexanediol diacrylate (HDDA) that are bi-functional monomers to a ratio of 5:4:1 by weight.

Then, a mixture of nematic liquid crystal "BL009" (mixture) available from Merck that has positive dielectric anisotropy and a chiral material "CB15" also available from Merck mixed at a ratio of 99:1 by weight was added to the polymer precursors at a mixing ratio of 7:3 by weight. The obtained mixture was then stirred and mixed well on a hot plate heated to 110° C. Thereafter, a weight portion of "IRGACURE 184" available from Ciba Geigy was added as polymerization initiator to 100 weight portions of the above mixture. The mixture was then stirred and mixed well also at 110° C.

Thereafter, 1,000Å thick ITO electrodes 3a, 3b were formed by photolithography respectively on a pair of 1 mm thick glass substrates 1a, 1b as shown in FIGS. 1A and 1B. Then, a 1,000Å thick coat of SiO$_2$ film 6 was formed on the ITO electrode 3b on one of the substrates by sputtering except the electrode leading out section and subsequently comb-shaped ITO electrodes 4a, 4b were formed on the coat film by photolithography. When forming the electrodes 4a, 4b, resist ("OEBR1000", tradename, available from Tokyo Oka) was applied to a thickness of 0.5 μm by spin coating and exposed to light by means of an exposure system ("PLA520": tradename, available from Canon). The comb-shaped electrodes had a width L3 of 2 μm and separated from each other by a gap L2 of 10 μm.

Then, silica beads (not shown) having a particle size of 7 μm and adhesive particles (not shown) were sown on the pair of substrates 1a, 1b, which were then bonded together with a gap L1 of 7 μm interposed between them.

Thereafter, the bonded substrates were held on a thermoregulator at 110° C. and the mixture of the liquid crystal, the polymer precursors and the polymerization initiator was injected into the gap between the substrates and then irradiated with ultraviolet rays at an intensity level of 10 mW/cm$^2$ for 10 minutes. Subsequently, the work was held still for 30 minutes without being irradiated with ultraviolet rays and cooled to room temperature. As a result of the above process, the polymer precursors were polymerized to produce polymer dispersed liquid crystal 2. At this stage, the element was opaque because of scattered light.

An AC voltage (±80V, 2.5 kHz) was applied between the electrodes 3a and 3b of the prepared liquid crystal panel P1 to turn it transparent (see symbol Δ1 In FIG. 7). The transparent state of the panel was maintained after removing the applied AC voltage (see symbol Δ2 in FIG. 7). Then, a same AC voltage (±80V, 2.5 kHz) was applied between the electrodes 4a and 4b to turn the liquid crystal panel P1 opaque (see symbol Δ3 in FIG. 7) and the opaque state of the panel was maintained after removing the applied AC voltage (see symbol Δ4 in FIG. 7).

EXAMPLE 5

Figure 2B:
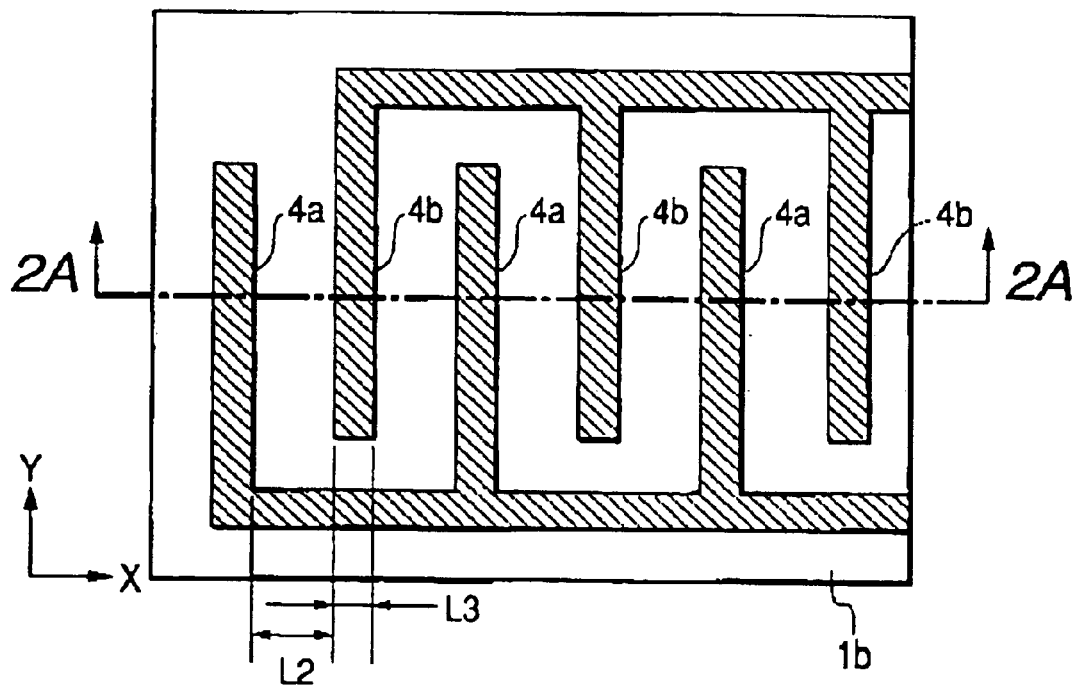

In this example, a liquid crystal panel P2 as shown in FIGS. 2A and 2B was prepared.

More specifically, a 1,000 Å thick ITO electrode 3a was formed by photolithography on a 1 mm thick glass substrate 1a, while 1,000 Å thick comb-shaped ITO electrodes 4a, 4b were formed by photolithography on another 1 mm thick glass substrate 1b. The comb-shaped electrodes had a width L3 of 3 μm and separated from each other by a gap L2 of 10 μm. The photolithography process was conducted as in Example 1.

Then, silica beads (not shown) having a particle size of 7 μm and adhesive particles (not shown) were sown on the pair of substrates 1a, 1b, which were then bonded together with a gap L1 of 7 μm interposed between them.

Thereafter, as in Example 1, the bonded substrates were held on a thermoregulator at 110° C. and the mixture of the liquid crystal, the polymer precursors and the polymerization initiator was injected into the gap between the substrates and then irradiated with ultraviolet rays at an intensity level of 10 mW/cm$^2$ for 10 minutes. Subsequently, the work was held still for 30 minutes without being irradiated with ultraviolet rays and cooled to room temperature. As a result of the above process, the polymer precursors were polymerized to produce polymer dispersed liquid crystal 2. At this stage, the element was opaque because of scattered light.

An AC voltage (±80V, 2.5 kHz) was applied between the electrode 3a and the electrodes 4a, 4b of the prepared liquid crystal panel P2 to turn it transparent (see symbol Δ1 in FIG. 7). The transparent state of the panel was maintained after removing the applied AC voltage (see symbol Δ2 in FIG. 7). Then, a same AC voltage (±80V, 2.5 kHz) was applied between the electrodes 4a and 4b to turn the liquid crystal panel P2 opaque (see symbol Δ3 in FIG. 7) and the opaque state of the panel was maintained after removing the applied AC voltage (see symbol Δ4 in FIG. 7).

EXAMPLE 6

Figure 3A:
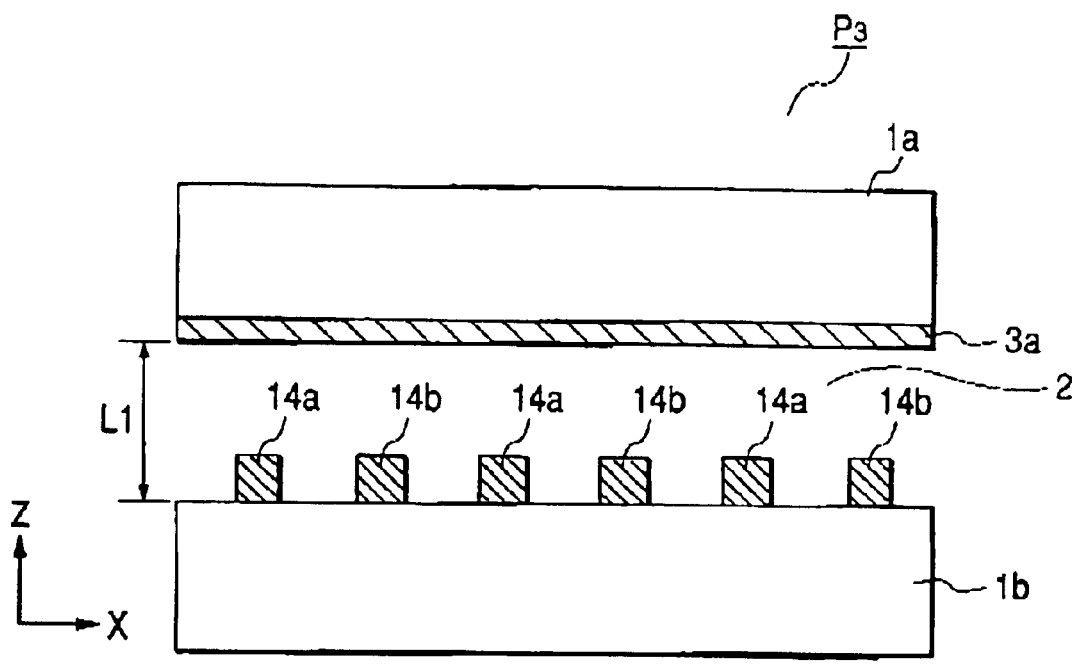
FIGS. 3A and 3B are schematic illustrations of the structure of still another embodiment of liquid crystal device according to the invention.
Figure 3B:
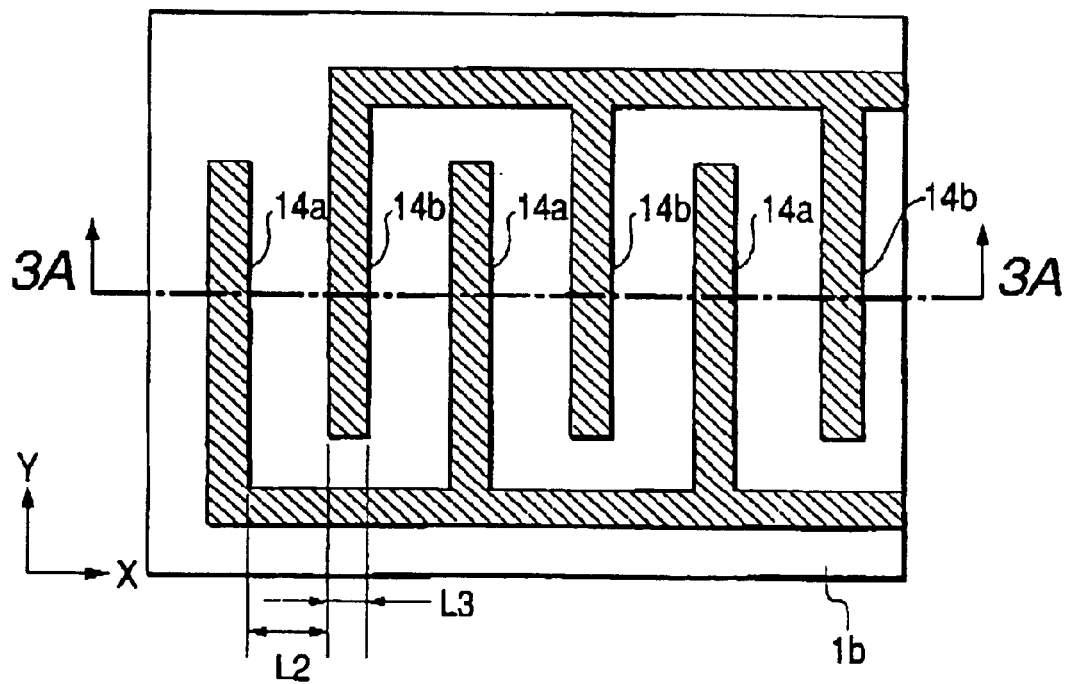

In this example, a liquid crystal panel P3 as shown in FIGS. 3A and 3B was prepared.

More specifically, a 1,000 Å thick ITO electrode 3a was formed by photolithography on a 1 mm thick glass substrate 1a, while 3 μm high comb-shaped ITO electrodes 14a, 14b were formed on another 1 mm thick glass substrate 1b by sequentially laying a 10 Å thick Ti layer and a 20 Å thick Au layer, forming thereon a 3.5 μm thick resist pattern by photolithography and then forming an Ni plate on the surface by electrolytic plating. The comb-shaped electrodes had a width L3 of 3 μm and separated from each other by a gap L2 of 10 μm. Then, after removing the resist, the work was subjected to a wet etching process where the 10 Å thick Ti layer and the 20 Å thick Au layer of the underlying electrode were removed by Ki+$I_2$ for removing Au and then hydrofluoric acid (diluted by an amount of water ten times as much as the acid) for removing Ti.

Then, silica beads (not shown) having a particle size of 7 μm and adhesive particles (not shown) were sown on the pair of substrates 1a, 1b, which were then bonded together with a gap L1 of 7 μm interposed between them.

Thereafter, as in Example 1, the bonded substrates were held on a thermoregulator at 110° C. and the mixture of the polymer precursors and the polymerization initiator was injected into the gap between the substrates and then irradiated with ultraviolet rays at an intensity level of 10 mW/cm$^2$ for 10 minutes. Subsequently, the work was held still for 30 minutes without being irradiated with ultraviolet rays and cooled to room temperature. As a result of the above process, the polymer precursors were polymerized to produce polymer dispersed liquid crystal 2. At this stage, the element was opaque because of scattered light.

An AC voltage (±80V, 2.5 kHz) was applied between the electrode 3a and the electrodes 14a, 14b of the prepared liquid crystal panel P3 to turn it transparent (see symbol Δ1 in FIG. 7). The transparent state of the panel was maintained after removing the applied AC voltage (see symbol Δ2 in FIG. 7). Then, a same AC voltage (±80V, 2.5 kHz) was applied between the electrodes 14a and 14b to turn the liquid crystal panel P3 opaque (see symbol Δ3 in FIG. 7) and the opaque state of the panel was maintained after removing the applied AC voltage (see symbol Δ4 in FIG. 7).

EXAMPLE 7

In this example, a liquid crystal panel P4 as shown in FIGS. 4A and 4B was prepared.

More specifically, a 1,000 Å thick ITO electrode 3a was formed by photolithography on a 1 mm thick glass substrate 1a, while an aluminum electrode 3b was formed on another 1 mm thick glass substrate 1b. Then, a 0.1 μm thick insulating layer was formed on the surface of the aluminum electrode 3b by using acrylic resin ("OPTOMER SS6699G", tradename, available from Nippon Synthetic Rubber) and an ITO film was formed thereon by sputtering and subsequently subjected to a photolithography process to produce a comb-shaped electrode 4a as shown in FIG. 4B. The teeth of the comb-shaped electrode had a width L3 of 3 μm and separated from each other by a gap L2 of 10 μm.

Then, silica beads (not shown) having a particle size of 7 μm and adhesive particles (not shown) were sown on the pair of substrates 1a, 1b, which were then bonded together with a gap L1 of 7 μm interposed between them.

Thereafter, as in Example 1, the bonded substrates were held on a thermoregulator at 110° C. and the mixture of the liquid crystal, the polymer precursors and the polymerization initiator was injected into the gap between the substrates and then irradiated with ultraviolet rays at an intensity level of 10 mW/Cm$^2$ for 10 minutes. Subsequently, the work was held still for 30 minutes without being irradiated with ultraviolet rays and cooled to room temperature. As a result of the above process, the polymer precursors were polymerized to produce polymer dispersed liquid crystal 2. At this stage, the element was opaque because of scattered light.

An AC voltage (±80V, 2.5 kHz) was applied between the electrodes 3a and 3b of the prepared liquid crystal panel P4 to turn it transparent. The transparent state of the panel was maintained after removing the applied AC voltage. Then, a same AC voltage (±80V, 2.5 kHz) was applied between the electrodes 4a and 3b to turn the liquid crystal panel P4 opaque and the opaque state of the panel was maintained after removing the applied AC voltage.

EXAMPLE 8

In this example, a liquid crystal panel P5 as shown in FIGS. 5A and 5B was prepared.

More specifically, a 1,000 Å thick ITO electrode 3a was formed by photolithography on a 200 μm thick PET film substrate 1a. On the other hand, an ITO film was formed on another 200 μm thick PET film substrate 1b and then subjected to a patterning operation, using photolithography, to produce a comb-shaped electrode 24b. Subsequently, a 0.1 μm thick insulating layer 30 was formed thereon by spin coating by using acryl type resin ("OPTOMER SS6699G", tradename, available from Nippon Synthetic Rubber) and an ITO film was formed thereon by sputtering and subsequently subjected to a patterning operation, using a photolithography process, to produce a comb-shaped electrode 24a as shown in FIG. 5B. The teeth of the comb-shaped electrodes had a width L3 of 3 μm and separated from each other by a gap L2 of 3.5 μm.

Then, silica beads (not shown) having a particle size of 7 μm and adhesive particles (not shown) were sown on the pair of substrates 1a, 1b, which were then bonded together with a gap L1 of 7 μm interposed between them.

Thereafter, as in Example 1, the bonded substrates were held on a thermoregulator at 110° C. and the mixture of the polymer precursors and the polymerization initiator was injected into the gap between the substrates and then irradiated with ultraviolet rays at an intensity level of 10 mW/cm$^2$ for 10 minutes. Subsequently, the work was held still for 30 minutes without being irradiated with ultraviolet rays and cooled to room temperature. As a result of the above process, the polymer precursors were polymerized to produce polymer dispersed liquid crystal 2. At this stage, the element was opaque because of scattered light.

An AC voltage (±80V, 2.5 kHz) was applied between the electrode 3a and the electrodes 24a, 24b of the prepared liquid crystal panel P5 to turn it transparent. The transparent state of the panel was maintained after removing the applied AC voltage. Then, a same AC voltage (±80V, 2.5 kHz) was applied between the electrodes 24a and 24b to turn the liquid crystal panel P5 opaque and the opaque state of the panel was maintained after removing the applied AC voltage.

EXAMPLE 9

In this example, a liquid crystal panel P6 as shown in FIGS. 6A and 6B was prepared.

More specifically, 1,000 Å thick ITO electrodes 3a, 3b were formed by photolithography respectively on a pair of 1 mm thick glass substrates 1a, 1b. Then, a 1,000 Å thick coat of $SiO_2$ film 6 was formed on the ITO electrode 3b on one of the substrates 1b by sputtering except the electrode leading out section and subsequently comb-shaped ITO electrodes 4a, 4b were formed on the coat film by photolithography. When forming the electrodes 4a, 4b, resist ("OEBR1000", tradename, available from Tokyo Oka) was applied to a thickness of 0.5 μm by spin coating and exposed to light by means of an exposure system ("PLA520", tradename, available from Canon). The comb-shaped electrodes had a width L3 of 3 μm and separated from each other by a gap L2 of 10 μm. Meanwhile, a 3 μm thick insulating coat layer 5 was formed by spin coating on the ITO electrode 3a arranged on the other substrate 1a except the electrode leading out section by using acryl type resin (CFPR-CL", tradename, available from Tokyo Oka) and baking the resist in two steps, a preliminary baking step conducted at 90° C. for 20 minutes and a subsequent proper baking step conducted at 210° C. for 30 minutes.

Then, silica beads (not shown) having a particle size of 7 μm and adhesive particles (not shown) were sown on the pair of substrates 1a, 1b, which were then bonded together with a gap L1 of 7 μm interposed between them.

Thereafter, the bonded substrates were held on a thermoregulator at 110° C. and the mixture of the liquid crystal, the polymer precursors and the polymerization initiator same as the one used in Example 1 was injected into the gap between the substrates and then irradiated with ultraviolet rays at an intensity level of 10 mW/cm² for 10 minutes. Subsequently, the work was held still for 30 minutes without being irradiated with ultraviolet rays and cooled to room temperature. As a result of the above process, the polymer precursors were polymerized to produce polymer dispersed liquid crystal 2. At this stage, the element was opaque because of scattered light.

An AC voltage (±80V, 2.5 kHz) was applied between the electrodes 3a and 3b of the prepared liquid crystal panel P6 to turn it transparent (see symbol Δ1 in FIG. 7). The transparent state of the panel was maintained after removing the applied AC voltage (see symbol Δ2 in FIG. 7). Then, a same AC voltage (80V, 2.5 kHz) was applied between the electrodes 4a and 4b to turn the liquid crystal panel P6 opaque (see symbol Δ3 in FIG. 7) and the opaque state of the panel was maintained after removing the applied AC voltage (see symbol Δ4 in FIG. 7).

The contrast between the transparent state and the opaque state of the element was determined in terms of the ratio of the intensities of transmitted light in the two states to find that the intensity of transmitted light in the opaque state of this element was reduced from that of the element of Example 1 to improve the contrast.

EXAMPLE 10

In this example, a liquid crystal panel P1 as shown in FIGS. 1A and 1B was prepared and additionally the substrate was subjected to a uniaxial orienting treatment.

More specifically, 1,000 Å thick ITO electrodes 3a, 3b were formed by photolithography respectively on a pair of 1 mm thick glass substrates 1a, 1b as shown in FIGS. 1A and 1B. Then, a 1,000 Å thick coat of $SiO_2$ film was formed on the ITO electrode 3b on one of the substrates by sputtering except the electrode leading out section and subsequently comb-shaped ITO electrodes 4a, 4b were formed on the coat film by photolithography. When forming the electrodes 4a, 4b, resist ("OEBR1000", tradename, available from Tokyo Oka) was applied to a thickness of 0.5 μm by spin coating and exposed to light by means of an exposure system ("PLA520", tradename, available from Canon). The comb-shaped electrodes had a width L3 of 3 μm and separated from each other by a gap L2 of 10 μm. Subsequently, the surface of the substrate 1b where the electrodes 4a, 4b were formed was subjected to a uniaxial orienting treatment of rubbing the surface by means of a nylon cloth in the y direction.

Then, silica beads (not shown) having a particle size of 7 μm and adhesive particles (not shown) were sown on the pair of substrates 1a, 1b, which were then bonded together with a gap L1 of 7 μm interposed between them.

Thereafter, the bonded substrates were held on a thermoregulator at 110° C. and the mixture of the liquid crystal, the polymer precursors and the polymerization initiator same as the one used in Example 1 was injected into the gap between the substrates and then irradiated with ultraviolet rays at an intensity level of 10 mW/cm² for 10 minutes. Subsequently, the work was held still for 30 minutes without being irradiated with ultraviolet rays and cooled to room temperature. As a result of the above process, the polymer precursors were polymerized to produce polymer dispersed liquid crystal 2. At this stage, the element was opaque because of scattered light.

An AC voltage (±80V, 2.5 kHz) was applied between the electrodes 3a and 3b of the prepared liquid crystal panel P1 to turn it transparent (see symbol Δ1 in FIG. 7). The transparent state of the panel was maintained after removing the applied AC voltage (see symbol Δ2 in FIG. 7). Then, a same AC voltage (±80V, 2.5 kHz) was applied between the electrodes 4a and 4b to turn the liquid crystal panel P1 opaque (see symbol Δ3 in FIG. 7) and the opaque state of the panel was maintained after removing the applied AC voltage (see symbol Δ4 in FIG. 7).

The contrast between the transparent state and the opaque state of the element was determined in terms of the ratio of the intensities of transmitted light in the two states to find that the intensity of transmitted light in the opaque state of this element was reduced from that of the element of Example 1 to improve the contrast.

EXAMPLE 11

In this example, a liquid crystal panel P1 as shown in FIGS. 1A and 1B was prepared and additionally the substrate 1b was provided with an orientation film of which surface was subjected to a uniaxial orienting treatment.

More specifically, 1,000 Å thick ITO electrodes 3a, 3b were formed by photolithography respectively on a pair of 1 mm thick glass substrates 1a, 1b as shown in FIGS. 1A and 1B. Then, a 1,000 Å thick coat of $SiO_2$ film was formed on the ITO electrode 3b on one of the substrates by sputtering except the electrode leading out section and subsequently comb-shaped ITO electrodes 4a, 4b were formed on the coat film by photolithography. When forming the electrodes 4a, 4b, resist ("OEBR1000", tradename, available from Tokyo Oka) was applied to a thickness of 0.5 μm by spin coating and exposed to light by means of an exposure system ("PLA520", tradename, available from Canon). The comb-shaped electrodes had a width L3 of 3 μm and separated from each other by a gap L2 of 10 μm Subsequently, a 50 Å thick polyimide layer was formed thereon by spin coating. Then, the substrate 1b was subjected to a uniaxial orienting treatment of rubbing the surface by means of a nylon cloth.

Then, silica beads (not shown) having a particle size of 7 μm and adhesive particles (not shown) were sown on the pair of substrates 1a, 1b, which were then bonded together with a gap L1 of 7 μm interposed between them.

Thereafter, the bonded substrates were held on a thermoregulator at 110° C. and the mixture of the polymer precursors and the polymerization initiator same as the one used in Example 1 was injected into the gap between the substrates and then irradiated with ultraviolet rays at an intensity level of 10 mW/cm$^2$ for 10 minutes. Subsequently, the work was held still for 30 minutes without being irradiated with ultraviolet rays and cooled to room temperature. As a result of the above process, the polymer precursors were polymerized to produce polymer dispersed liquid crystal 2. At this stage, the element was opaque because of scattered light.

An AC voltage (±80V, 2.5 kHz) was applied between the electrodes 3a and 3b of the prepared liquid crystal panel P1 to turn it transparent (see symbol Δ1 in FIG. 7). The transparent state of the panel was maintained after removing the applied AC voltage (see symbol Δ2 in FIG. 7). Then, a same AC voltage (±80V, 2.5 kHz) was applied between the electrodes 4a and 4b to turn the liquid crystal panel P1 opaque (see symbol Δ3 in FIG. 7) and the opaque state of the panel was maintained after removing the applied AC voltage (see symbol Δ4 in FIG. 7).

The contrast between the transparent state and the opaque state of the element was determined in terms of the ratio of the intensities of transmitted light in the two states to find that the intensity of transmitted light in the opaque state of this element was reduced from that of the element of Example 1 to improve the contrast.

EXAMPLE 12

In this example, a plurality of liquid crystal panels P1 as shown in FIGS. 1A and 1B and a plurality of panels P6 as shown in FIGS. 6A and 6B were prepared. The panels P1 and P6 were respectively identical with those prepared in Examples 1 and 9.

The insulating layer showed a dielectric constant of 5.

Four different liquid crystal materials showing respective dielectric constants that were different from each other were prepared. They are listed in Table 1 below.

TABLE 1

| liquid crystal material | A | B | C | D |
|---|---|---|---|---|
| dielectric constant | 3.2 | 7.0 | 12.2 | 15.5 |

A mixture of monomers same as that of Example 1 was used as polymer material.

Subsequently, for each of the liquid crystal panels, the bonded substrates were held on a thermoregulator at 110° C. and the mixture of one of the above listed liquid crystal materials and the polymer precursors and the polymerization initiator was injected into the gap between the substrates and then irradiated with ultraviolet rays at an intensity level of 10 mW/cm$^2$ for 10 minutes. Subsequently, the work was held still for 30 minutes without being irradiated with ultraviolet rays and cooled to room temperature. As a result of the above process, the polymer precursors were polymerized to produce polymer dispersed liquid crystal 2. At this stage, the element was opaque because of scattered light.

Again, for each of the electric panels P1 and P6, an AC voltage (2.5 kHz) was applied between the electrodes 3a and 3b of the prepared liquid crystal panel to turn it transparent (see symbol Δ1 in FIG. 7). The transparent state of the panel was maintained after removing the applied AC voltage (see symbol Δ2 in FIG. 7). Then, a same AC voltage (2.5 kHz) was applied between the electrodes 4a and 4b to turn the liquid crystal panel opaque (see symbol Δ3 in FIG. 7) and the opaque state of the panel was maintained after removing the applied AC voltage (see symbol Δ4 in FIG. 7). Note that the voltage applied to each of the electric panels was sufficiently high for forming a transparent state and a scattered state.

Figure 9:
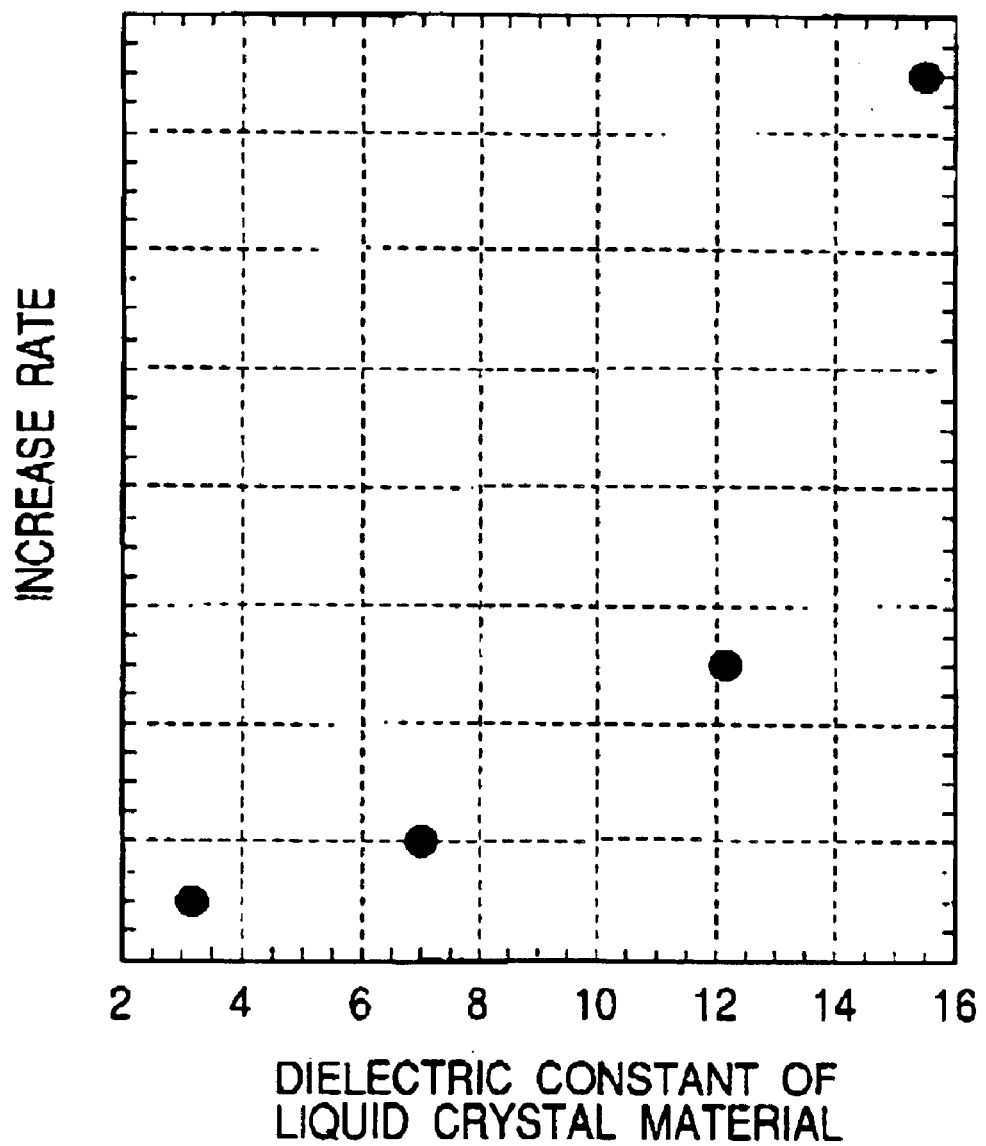
FIG. 9 is a graph illustrating the relationship between the dielectric constant of liquid crystal and the rate of increase of contrast.

The contrast between the transparent state and the opaque state of each element was determined in terms of the ratio of the intensities of transmitted light in the two states to find that the intensity of transmitted light in the opaque state was more reduced to improve the contrast in the liquid crystal panels P1 than in the liquid crystal panels P1. The increase ratio of contrast was determined by the formula of "Increase ratio"="Contrast of P6 panels"/"Contrast of P1 panels" to obtain the results as shown in FIG. 9. While all the liquid crystal panels P6 showed an improvement of contrast. The improvement was particularly remarkable when the liquid crystal material showed a dielectric constant more than twice of the dielectric constant of the insulating layer (or the dielectric constant is greater than 10).

What is claimed is:

1. A liquid crystal device comprising:
   a pair of substrates arranged vis-a-vis with a predetermined gap separating them;
   polymer dispersed liquid crystal formed by dispersing liquid crystal in a polymer material and arranged in the gap separating the pair of substrates;
   first electrodes for forming an electric field in a first direction relative to said polymer dispersed liquid crystal, said first direction being substantially perpendicular to the pair of substrates; and
   second electrodes for forming an electric field in a second direction relative to said polymer dispersed liquid crystal, said second electrodes comprising at least one comb-shaped electrode, said second direction being substantially parallel to the pair of substrates,
   wherein said polymer dispersed liquid crystal alternates between a transparent state and a light-scattering state when a voltage is applied to the first electrodes and the second electrodes.

2. The liquid crystal device according to claim 1, wherein said liquid crystal dispersed in said polymer material is oriented in two directions substantially rectangularly intersecting each other depending on the electric field formed by said first electrodes and the electric field formed by said second electrodes.

3. The liquid crystal device according to claim 2, wherein said liquid crystal dispersed in said polymer material has positive dielectric anisotropy.

4. The liquid crystal device according to claim 1, wherein said polymer material is optically isotropic.

5. The liquid crystal device according to claim 4, wherein the refractive index of said polymer material is substantially equal to either of the refractive indices in the direction of the principal axis of said liquid crystal dispersed in said polymer material.

6. The liquid crystal device according to claim 5, wherein said liquid crystal dispersed in said polymer material has substantially uniaxial optical anisotropy and the refractive index of said polymer material is substantially equal to either the refractive index for ordinary light or the refractive index for extraordinary light of said liquid crystal dispersed in said polymer material.

7. The liquid crystal device according to claim 1, wherein said first electrodes comprise a pair of electrodes arranged to sandwich said polymer dispersed liquid crystal and adapted to form an electric field in a direction normal to said substrates and said second electrodes comprise a pair of electrodes arranged in a direction running along said substrates and adapted to form an electric field in said direction.

8. The liquid crystal device according to claim 7, wherein said liquid crystal dispersed in said polymer material has substantially uniaxial optical anisotropy and the refractive index of said polymer material is substantially equal to the refractive index for ordinary light of said liquid crystal dispersed in said polymer material.

9. The liquid crystal device according to claim 8, wherein the transparent state appears therein when an electric field is produced in a direction normal to said substrates by applying a voltage to said first electrodes arranged to sandwich said polymer dispersed liquid crystal and the light-scattering state appears therein when an electric field is produced in a direction running along said substrates by applying a voltage to said second electrodes arranged in said direction.

10. The liquid crystal device according to claim 7, wherein said liquid crystal dispersed in said polymer material has substantially uniaxial optical anisotropy and the refractive index of said polymer material is substantially equal to the refractive index for extraordinary light of said liquid crystal dispersed in said polymer material.

11. The liquid crystal device according to claim 10, wherein the light-scattering state appears therein when an electric field is produced in a direction normal to said substrates by applying a voltage to said first electrodes arranged to sandwich said polymer dispersed liquid crystal and the transparent state appears therein when an electric field is produced in a direction running along said substrates by applying a voltage to said second electrodes arranged in said direction.

12. The liquid crystal device according to claim 7, wherein said second electrodes are arranged in the proximity of either one of said substrates.

13. The liquid crystal device according to claim 12, wherein an insulating layer is arranged to cover a first electrode formed on the substrate remote from said second electrodes.

14. The liquid crystal device according to claim 13, wherein the dielectric constant $\in_1$ of the insulating layer arranged on said first electrode and the dielectric constant $\in_2$ of said polymer dispersed liquid crystal show a relationship of $\in_1 < \in_2$.

15. The liquid crystal device according to claim 13, wherein the dielectric constant $\in_1$ of the insulating layer arranged on said first electrode and the dielectric constant $\in_2$ of said polymer dispersed liquid crystal show a relationship of $2 \times \in_1 < \in_2$.

16. The liquid crystal device according to claim 1, wherein at least either one of said substrates is subjected to a uniaxial orienting treatment in a direction rectangularly intersecting the electric field formed by said second electrodes.

17. The liquid crystal device according to claim 16, wherein said polymer material is optically isotropic.

18. The liquid crystal device according to any of claims 1 through 17, wherein said polymer dispersed liquid crystal has a memory property.

\* \* \* \* \*

UNITED STATES PATENT AND TRADEMARK OFFICE
CERTIFICATE OF CORRECTION

PATENT NO.      : 6,791,658 B2
DATED           : September 14, 2004
INVENTOR(S)     : Maruyama et al.

It is certified that error appears in the above-identified patent and that said Letters Patent is hereby corrected as shown below:

Column 1,
Line 19, "is" should read -- are --.
Line 31, "In" should read -- in --.

Column 2,
Lines 34 and 62, "polarizating" should read -- polarizing --.
Line 56, "do not" should be deleted.
Line 63, "poorly" should read -- poor --.

Column 3,
Line 1, "material as" should read -- material such as --.
Line 21, "Is" should read -- is --.

Column 4,
Line 35, "In" should read -- in --.
Line 57, "substrate 4a" should read -- substrates --.

Column 6,
Line 2, "scattered. Is" should read -- scattered is -- and "to and" should read -- to 0 and --.
Line 18, "Is" should read -- is --.
Line 28, "to uniaxial" should read -- to be uniaxial --.
Line 36, "If" should read -- if --.
Line 43, "no=np" should read -- ne=np --.

Column 7,
Line 67, "di(meth)acryate." should read -- di(meth)acrylate. --.

Column 8,
Line 25, "(e.g." should read -- (e.g., --.

Column 9,
Line 2, "needs" should read -- need --.
Line 18, "oppositely" should read -- opposite --.

Column 10,
Line 14, "(S-polarized light):(ne+2no)/3-np=-$\Delta$n/3" should read
-- (S-polarized light):(ne+2no)/3-np=$\Delta$n/3 --.

UNITED STATES PATENT AND TRADEMARK OFFICE
CERTIFICATE OF CORRECTION

PATENT NO. : 6,791,658 B2
DATED : September 14, 2004
INVENTOR(S) : Maruyama et al.

It is certified that error appears in the above-identified patent and that said Letters Patent is hereby corrected as shown below:

Column 12,
Line 13, "spacers" should read -- spacer --.
Line 26, "used" should read -- used, --.

Column 15,
Line 12, "depends" should read -- depending --.

Column 19,
Line 51, "voltage (80V, 2.5 kHz)" should read -- voltage (±80V, 2.5 kHz) --.

Column 21,
Line 4, "10 $\mu$m" should read -- 10 $\mu$m. --.

Column 22,
Line 25, "panels P1 than" should read -- panels P6 than --.
Line 28, "'Increase ratio" = "Contrast of P6' should read
-- "Increase ratio" = "Contrast of P6 panels"/"Contrast of P1 panels" --.
Line 29, "panels"/"Contrast of P1 panels'" should be deleted.
Line 31, "contrast. The" should read -- contrast, the --.

Signed and Sealed this

First Day of March, 2005

JON W. DUDAS
*Director of the United States Patent and Trademark Office*